(12) United States Patent
Chaudhri et al.

(10) Patent No.: US 8,619,038 B2
(45) Date of Patent: Dec. 31, 2013

(54) EDITING INTERFACE

(75) Inventors: Imran A. Chaudhri, San Francisco, CA (US); Bas Ording, San Francisco, CA (US); Steven Jobs, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 760 days.

(21) Appl. No.: 11/849,938

(22) Filed: Sep. 4, 2007

(65) Prior Publication Data

US 2009/0058821 A1    Mar. 5, 2009

(51) Int. Cl.
*G06F 3/0486* (2013.01)

(52) U.S. Cl.
USPC .......................... 345/173; 715/769; 715/835

(58) Field of Classification Search
USPC ................. 345/173–178; 715/702, 769, 776, 715/778–779, 810, 835, 837, 864
See application file for complete search history.

(56) References Cited

U.S. PATENT DOCUMENTS

| | | |
|---|---|---|
| 5,146,556 A | 9/1992 | Hullot et al. |
| 5,196,838 A | 3/1993 | Meier et al. |
| 5,491,778 A | 2/1996 | Gordon et al. |
| 5,642,490 A | 6/1997 | Morgan et al. ............. 395/342 |
| 5,644,739 A | 7/1997 | Moursund |
| 5,657,049 A * | 8/1997 | Ludolph et al. ............. 715/856 |
| 5,726,687 A * | 3/1998 | Belfiore et al. ............. 715/785 |
| 5,745,096 A | 4/1998 | Ludolph et al. |
| 5,745,910 A | 4/1998 | Piersol et al. |
| 5,754,179 A | 5/1998 | Hocker et al. |
| 5,757,371 A | 5/1998 | Oran et al. |
| 5,760,773 A * | 6/1998 | Berman et al. ............. 715/808 |
| 5,796,401 A | 8/1998 | Winer |
| 5,812,862 A | 9/1998 | Smith et al. |
| 5,825,349 A | 10/1998 | Meier et al. |
| 5,825,357 A | 10/1998 | Malamud et al. |
| 5,877,765 A | 3/1999 | Dickman et al. ............. 345/349 |
| 5,914,716 A | 6/1999 | Rubin et al. |
| 5,914,717 A | 6/1999 | Kleewein et al. |
| 5,923,327 A | 7/1999 | Smith et al. |
| 5,995,106 A | 11/1999 | Naughton et al. ............ 345/357 |
| 6,043,818 A | 3/2000 | Nakano et al. |
| 6,049,336 A | 4/2000 | Liu et al. |

(Continued)

FOREIGN PATENT DOCUMENTS

| | | | |
|---|---|---|---|
| CA | 2349649 | * 6/2001 | ................ G06F 3/14 |
| CA | 2349649 A1 | 1/2002 | |

(Continued)

OTHER PUBLICATIONS

International Search Report mailed Jan. 8, 2009 from corresponding International Application No. PCT/US2008/074625.

(Continued)

*Primary Examiner* — Amr Awad
*Assistant Examiner* — Stephen Bray
(74) *Attorney, Agent, or Firm* — Morgan, Lewis & Bockius LLP

(57) ABSTRACT

A portable electronic device displays icons (e.g., graphical objects) in one or more regions of a user interface of a touch-sensitive display, and detects user input specifying an exchange of positions of icons in the user interface. In some aspects, the respective positions of two icons in a user interface can be selected to exchange positions in the one or more regions of the user interface, and one or both icons can change their visual appearance to indicate their selection status.

18 Claims, 11 Drawing Sheets

(56) References Cited

U.S. PATENT DOCUMENTS

| | | | |
|---|---|---|---|
| 6,072,486 A | 6/2000 | Sheldon et al. | |
| 6,111,573 A | 8/2000 | McComb et al. | |
| 6,133,914 A | 10/2000 | Rogers et al. | |
| 6,144,863 A | 11/2000 | Charron | 455/566 |
| 6,195,094 B1 | 2/2001 | Celebiler | |
| 6,229,542 B1 | 5/2001 | Miller | |
| 6,275,935 B1* | 8/2001 | Barlow et al. | 713/182 |
| 6,278,454 B1 | 8/2001 | Krishnan | |
| 6,313,853 B1 | 11/2001 | Lamontagne et al. | |
| 6,317,140 B1 | 11/2001 | Livingston et al. | |
| 6,323,846 B1 | 11/2001 | Westerman et al. | 345/173 |
| 6,353,451 B1 | 3/2002 | Teibel et al. | |
| 6,377,698 B1 | 4/2002 | Cumoli et al. | |
| 6,396,520 B1 | 5/2002 | Ording | |
| 6,433,801 B1 | 8/2002 | Moon et al. | 345/840 |
| 6,545,669 B1* | 4/2003 | Kinawi et al. | 345/173 |
| 6,570,557 B1 | 5/2003 | Westerman et al. | 345/173 |
| 6,628,309 B1* | 9/2003 | Dodson et al. | 715/769 |
| 6,677,932 B1 | 1/2004 | Westerman | 345/173 |
| 6,710,788 B1* | 3/2004 | Freach et al. | 715/778 |
| 6,763,388 B1 | 7/2004 | Tsimelzon | 709/228 |
| 6,781,575 B1 | 8/2004 | Hawkins et al. | 345/173 |
| 6,931,601 B2 | 8/2005 | Vronay et al. | |
| 6,934,911 B2 | 8/2005 | Salmimaa et al. | |
| 6,970,749 B1 | 11/2005 | Chinn et al. | |
| 6,976,210 B1 | 12/2005 | Silva et al. | 715/513 |
| 6,978,127 B1 | 12/2005 | Bulthuis et al. | |
| 7,007,239 B1 | 2/2006 | Hawkins et al. | |
| 7,071,943 B2 | 7/2006 | Adler | |
| 7,093,201 B2 | 8/2006 | Duarte | |
| 7,134,095 B1 | 11/2006 | Smith et al. | 715/860 |
| 7,231,229 B1 | 6/2007 | Hawkins et al. | 455/564 |
| 7,283,845 B2 | 10/2007 | De Bast | 455/566 |
| 7,355,593 B2 | 4/2008 | Hill et al. | |
| 7,362,331 B2 | 4/2008 | Ording | |
| 7,432,928 B2 | 10/2008 | Shaw et al. | |
| 7,434,177 B1 | 10/2008 | Ording et al. | |
| 7,487,467 B1 | 2/2009 | Kawahara et al. | |
| 7,490,295 B2 | 2/2009 | Chaudhri et al. | |
| 7,493,573 B2 | 2/2009 | Wagner | |
| 7,506,268 B2 | 3/2009 | Jennings et al. | |
| 7,509,588 B2 | 3/2009 | van Os et al. | |
| 7,512,898 B2 | 3/2009 | Jennings et al. | |
| 7,526,738 B2 | 4/2009 | Ording et al. | |
| 7,546,548 B2 | 6/2009 | Chew et al. | |
| 7,546,554 B2 | 6/2009 | Chiu et al. | |
| 7,561,874 B2 | 7/2009 | Wang et al. | |
| 7,624,357 B2 | 11/2009 | De Bast | 715/828 |
| 7,642,934 B2 | 1/2010 | Scott | |
| 7,683,889 B2 | 3/2010 | Rimas Ribikauskas et al. | |
| 7,719,542 B1 | 5/2010 | Gough et al. | |
| 7,730,401 B2 | 6/2010 | Gillespie et al. | |
| 7,735,021 B2 | 6/2010 | Padawer et al. | |
| 7,747,289 B2 | 6/2010 | Wang et al. | |
| 7,783,990 B2 | 8/2010 | Amadio et al. | |
| 7,805,684 B2 | 9/2010 | Arvilommi | |
| 7,810,038 B2 | 10/2010 | Matsa et al. | |
| 7,840,901 B2 | 11/2010 | Lacey et al. | |
| 7,853,972 B2 | 12/2010 | Brodersen et al. | |
| 7,856,602 B2 | 12/2010 | Armstrong | |
| 7,940,250 B2 | 5/2011 | Forstall | |
| 7,958,457 B1 | 6/2011 | Brandenberg et al. | |
| 7,996,789 B2* | 8/2011 | Louch et al. | 715/835 |
| 2001/0024195 A1 | 9/2001 | Hayakawa | 345/173 |
| 2001/0024212 A1 | 9/2001 | Ohnishi | 345/769 |
| 2002/0015024 A1 | 2/2002 | Westerman et al. | 345/173 |
| 2002/0015042 A1 | 2/2002 | Robotham et al. | |
| 2002/0024540 A1 | 2/2002 | McCarthy | |
| 2002/0038299 A1 | 3/2002 | Zernik et al. | |
| 2002/0054090 A1 | 5/2002 | Silva et al. | 345/747 |
| 2002/0085037 A1 | 7/2002 | Leavitt et al. | |
| 2002/0191029 A1 | 12/2002 | Gillespie et al. | 345/810 |
| 2003/0016241 A1 | 1/2003 | Burke | 345/733 |
| 2003/0030664 A1 | 2/2003 | Parry | |
| 2003/0048295 A1 | 3/2003 | Lilleness et al. | |
| 2003/0090572 A1 | 5/2003 | Belz et al. | |
| 2003/0169298 A1 | 9/2003 | Ording | |
| 2003/0184552 A1 | 10/2003 | Chadha | |
| 2003/0184587 A1 | 10/2003 | Ording et al. | 345/769 |
| 2003/0200289 A1 | 10/2003 | Kemp et al. | |
| 2003/0206195 A1 | 11/2003 | Matsa et al. | |
| 2003/0206197 A1 | 11/2003 | McInerney | |
| 2004/0103156 A1 | 5/2004 | Quillen et al. | |
| 2004/0109025 A1 | 6/2004 | Hullot et al. | |
| 2004/0121823 A1 | 6/2004 | Noesgaard et al. | |
| 2004/0155909 A1 | 8/2004 | Wagner | |
| 2004/0177148 A1 | 9/2004 | Tsimelzon, Jr. | |
| 2004/0215719 A1 | 10/2004 | Altshuler | |
| 2004/0222975 A1 | 11/2004 | Nakano et al. | |
| 2005/0005246 A1 | 1/2005 | Card et al. | |
| 2005/0024341 A1 | 2/2005 | Gillespie et al. | |
| 2005/0026644 A1 | 2/2005 | Lien | |
| 2005/0039134 A1 | 2/2005 | Wiggeshoff et al. | |
| 2005/0057524 A1 | 3/2005 | Hill et al. | |
| 2005/0057548 A1 | 3/2005 | Kim | |
| 2005/0060664 A1 | 3/2005 | Rogers | |
| 2005/0060665 A1 | 3/2005 | Rekimoto | |
| 2005/0091609 A1 | 4/2005 | Matthews et al. | 715/804 |
| 2005/0097089 A1 | 5/2005 | Nielsen et al. | |
| 2005/0120142 A1 | 6/2005 | Hall | |
| 2005/0134578 A1 | 6/2005 | Chambers et al. | 345/184 |
| 2005/0154798 A1 | 7/2005 | Nurmi | |
| 2005/0210018 A1 | 9/2005 | Singh et al. | |
| 2005/0229102 A1 | 10/2005 | Watson et al. | 715/739 |
| 2005/0250438 A1 | 11/2005 | Makipaa et al. | 455/3.06 |
| 2005/0251755 A1 | 11/2005 | Mullins, II et al. | |
| 2005/0262448 A1 | 11/2005 | Vronay et al. | |
| 2005/0275636 A1* | 12/2005 | Dehlin et al. | 345/173 |
| 2005/0289458 A1 | 12/2005 | Kylmanen | 715/513 |
| 2005/0289476 A1 | 12/2005 | Tokkonen | |
| 2006/0026521 A1 | 2/2006 | Hotelling et al. | |
| 2006/0026536 A1 | 2/2006 | Hotelling et al. | |
| 2006/0051073 A1 | 3/2006 | Jung et al. | |
| 2006/0055662 A1 | 3/2006 | Rimas-Ribikauskas et al. | |
| 2006/0075355 A1 | 4/2006 | Shiono et al. | 715/778 |
| 2006/0080616 A1 | 4/2006 | Vogel et al. | |
| 2006/0085763 A1 | 4/2006 | Leavitt et al. | |
| 2006/0112335 A1 | 5/2006 | Hofmeister et al. | 715/701 |
| 2006/0123360 A1 | 6/2006 | Anwar et al. | |
| 2006/0153531 A1 | 7/2006 | Kanegae et al. | |
| 2006/0174211 A1 | 8/2006 | Hoellerer et al. | |
| 2006/0197753 A1 | 9/2006 | Hotelling | 345/173 |
| 2006/0224997 A1 | 10/2006 | Wong et al. | |
| 2006/0236266 A1 | 10/2006 | Majava | |
| 2006/0238625 A1 | 10/2006 | Sasaki et al. | |
| 2006/0242596 A1 | 10/2006 | Armstrong | |
| 2006/0242604 A1 | 10/2006 | Wong et al. | |
| 2006/0242607 A1 | 10/2006 | Hudson | |
| 2006/0271864 A1 | 11/2006 | Satterfield et al. | |
| 2006/0271874 A1* | 11/2006 | Raiz et al. | 715/767 |
| 2006/0277460 A1 | 12/2006 | Forstall et al. | 715/513 |
| 2006/0278692 A1 | 12/2006 | Matsumoto et al. | |
| 2006/0282786 A1 | 12/2006 | Shaw et al. | |
| 2006/0282790 A1 | 12/2006 | Matthews et al. | |
| 2006/0284852 A1* | 12/2006 | Hofmeister et al. | 345/173 |
| 2006/0290661 A1 | 12/2006 | Innanen et al. | |
| 2007/0013665 A1 | 1/2007 | Vetelainen et al. | |
| 2007/0028269 A1 | 2/2007 | Nezu et al. | |
| 2007/0030362 A1 | 2/2007 | Ota et al. | |
| 2007/0055947 A1 | 3/2007 | Ostojic et al. | |
| 2007/0067272 A1 | 3/2007 | Flynt et al. | |
| 2007/0083827 A1 | 4/2007 | Scott et al. | |
| 2007/0083911 A1 | 4/2007 | Madden et al. | |
| 2007/0101297 A1 | 5/2007 | Forstall et al. | |
| 2007/0124677 A1 | 5/2007 | de los Reyes et al. | 715/705 |
| 2007/0150810 A1 | 6/2007 | Katz et al. | |
| 2007/0150830 A1 | 6/2007 | Ording et al. | |
| 2007/0156697 A1 | 7/2007 | Tsarkova | |
| 2007/0157089 A1 | 7/2007 | van Os et al. | |
| 2007/0177803 A1 | 8/2007 | Elias et al. | 382/188 |
| 2007/0177804 A1 | 8/2007 | Elias et al. | |
| 2007/0180395 A1 | 8/2007 | Yamashita et al. | |
| 2007/0189737 A1 | 8/2007 | Chaudhri et al. | |
| 2007/0192741 A1 | 8/2007 | Yoritate et al. | |

(56) References Cited

U.S. PATENT DOCUMENTS

| | | | |
|---|---|---|---|
| 2007/0243862 A1 | 10/2007 | Coskun et al. | |
| 2007/0245250 A1 | 10/2007 | Schechter et al. | |
| 2007/0260999 A1 | 11/2007 | Amadio et al. | |
| 2007/0266342 A1 | 11/2007 | Chang et al. | |
| 2007/0288860 A1 | 12/2007 | Ording et al. | |
| 2007/0288862 A1 | 12/2007 | Ording | |
| 2008/0001924 A1 | 1/2008 | de los Reyes et al. | |
| 2008/0005703 A1 | 1/2008 | Radivojevic et al. | |
| 2008/0034309 A1 | 2/2008 | Louch et al. | |
| 2008/0082930 A1 | 4/2008 | Omernick et al. | |
| 2008/0122796 A1 | 5/2008 | Jobs et al. | |
| 2008/0125180 A1 | 5/2008 | Hoffman et al. | |
| 2008/0161045 A1 | 7/2008 | Vuorenmaa | |
| 2008/0168367 A1 | 7/2008 | Chaudhri et al. | 715/764 |
| 2008/0168478 A1 | 7/2008 | Platzer et al. | |
| 2008/0182628 A1 | 7/2008 | Lee et al. | |
| 2008/0184112 A1* | 7/2008 | Chiang et al. | 715/700 |
| 2008/0201452 A1 | 8/2008 | Athas et al. | |
| 2008/0216017 A1 | 9/2008 | Kurtenbach et al. | |
| 2008/0259045 A1 | 10/2008 | Kim et al. | |
| 2009/0007017 A1 | 1/2009 | Anzures et al. | |
| 2009/0064055 A1 | 3/2009 | Chaudhri et al. | 715/863 |
| 2009/0128581 A1 | 5/2009 | Brid et al. | |
| 2009/0178008 A1 | 7/2009 | Herz et al. | |
| 2009/0199128 A1 | 8/2009 | Matthews et al. | |
| 2009/0295753 A1 | 12/2009 | King et al. | |
| 2010/0095238 A1* | 4/2010 | Baudet | 715/784 |
| 2010/0105454 A1 | 4/2010 | Weber et al. | |
| 2010/0169357 A1 | 7/2010 | Ingrassia et al. | |
| 2010/0318709 A1 | 12/2010 | Bell et al. | |
| 2011/0007009 A1 | 1/2011 | Ishihara et al. | |

FOREIGN PATENT DOCUMENTS

| | | | |
|---|---|---|---|
| CN | 1257247 A | 6/2000 | |
| CN | 1940833 A | 4/2007 | |
| EP | 0 322 332 A2 | 6/1989 | G06F 3/023 |
| EP | 0 626 635 A2 | 11/1994 | |
| EP | 0 689 134 A1 | 6/1995 | G06F 9/44 |
| EP | 0 844 553 A1 | 5/1998 | |
| EP | 1 143 334 A2 | 10/2001 | |
| EP | 1 231 763 A1 | 8/2002 | H04M 1/725 |
| EP | 1 517 228 A2 | 3/2005 | |
| EP | 1 744 242 | 1/2007 | |
| FR | 2 819 675 A1 | 7/2002 | |
| GB | 2 329 813 A | 3/1999 | |
| JP | 06 051930 | 2/1994 | |
| JP | 09 073381 | 3/1997 | |
| JP | 2000 105772 | 4/2000 | |
| JP | 2000 163031 | 6/2000 | |
| JP | 2002 149616 A | 5/2002 | |
| JP | 2003 162356 | 6/2003 | |
| JP | 2003 248538 | 9/2003 | |
| JP | 2004 062645 | 2/2004 | |
| JP | 2004 070492 | 3/2004 | |
| JP | 2004 164242 | 6/2004 | |
| JP | 2004 227393 | 8/2004 | |
| JP | 2004 341886 | 12/2004 | |
| JP | 2005 309933 A | 11/2005 | |
| JP | 2005 352924 | 12/2005 | |
| JP | 2009 522666 | 6/2009 | |
| KR | 2002-0010863 | 2/2002 | |
| WO | WO 99/28815 | 6/1999 | |
| WO | WO 99/38149 A1 | 7/1999 | |
| WO | WO 00/08757 A | 2/2000 | H03J 1/00 |
| WO | WO 01/16690 A2 | 3/2001 | G06F 3/033 |
| WO | WO 01/57716 A2 | 8/2001 | G06F 17/00 |
| WO | WO 02/08881 A | 1/2002 | |
| WO | WO 02/13176 A2 | 2/2002 | |
| WO | WO 03/107168 A1 | 12/2003 | G06F 3/023 |
| WO | WO 2004/063862 A2 | 7/2004 | |
| WO | WO 2005/041020 | 5/2005 | |
| WO | WO 2006/020304 A2 | 2/2006 | |
| WO | WO 2006/020305 A2 | 2/2006 | |
| WO | WO 2006/036069 | 4/2006 | |
| WO | WO 2006/037545 A2 | 4/2006 | |
| WO | WO 2007/032072 A1 | 3/2007 | |
| WO | 2007/069835 | 6/2007 | |
| WO | WO 2007/069835 A1 | 6/2007 | G06F 3/041 |
| WO | WO 2007/094894 A2 | 8/2007 | |

OTHER PUBLICATIONS

Office Action dated Aug. 12, 2010, received in Canadian Application No. 2633759, which corresponds to U.S. Appl. No. 11/459,602.

Office Action dated Sep. 2, 2010, received in U.S. Appl. No. 12/364,470.

Office Action dated Nov. 12, 2010, received in Chinese Application for Invention No. 200680053441.1, which corresponds to U.S. Appl. No. 11/459,602.

Final Office Action dated Dec. 1, 2010, received in U.S. Appl. No. 11/850,011.

Office Action dated Nov. 26, 2010, received in European Patent Application No. 09 700 333.9, which corresponds to U.S. Appl. No. 12/242,851.

Office Action dated Oct. 29, 2010, received in Australian Patent Application No. 2008296445, which corresponds to U.S. Appl. No. 11/849,938.

Office Action dated Oct. 15, 2010, received in European Application No. 08 829 660.3, which corresponds to U.S. Appl. No. 11/849,938.

Chang et al., "Animation: From Cartoons to the User Interface," UIST '93 Conference Proceedings, Atlanta, GA, Nov. 1993, 12 pages.

Elo, "Touschscreen User Manual, Elo Projected Capacitance Driver Software Version 1.00 (Serial)," Elo TouchSystems, Inc., pre Dec. 30, 2005 (exact date of publication unknown), 37 pages.

Forsberg et al., "Aperture Based Selection for Immersive Virtual Environments," Proceedings of the ACM Symposium on User Interface Software and Technology, 1996, 2 pages.

O'Hara, "Absolute Beginner's Guide to Microsoft Window XP," Que Publishing 2003, 1 page.

Invitation to Pay Additional Fees dated Jun. 27, 2008, received in International Application No. PCT/US2008/050430, which corresponds to U.S. Appl. No. 11/969,809.

International Search Report and Written Opinion dated Sep. 1, 2008, received in International Application No. PCT/US2008/050430, which corresponds to U.S. Appl. No. 11/969,809.

Office Action dated Jul. 28, 2011, received in Australian Patent Application No .2010200763, which corresponds to U.S. Appl. No. 11/459,602.

Grant for Invention Patent dated Jan. 28, 2011, Received in Chinese Patent Application No. ZL200680053441.1, which corresponds to U.S. Appl. No. 11/459,602.

Office Action dated Aug. 9, 2011, received in German Patent Application No. 11 2006 003 600.9, which corresponds to U.S. Appl. No. 11/459,602.

Office Action dated May 30, 2011, received in Japanese Patent Application No. 2008 548858, which corresponds to U.S. Appl. No. 11/459,602.

Office Action dated Jun. 27, 2011, received in Japanese Patent Application No. 2009-051921, which corresponds to U.S. Appl. No. 11/459,602.

Notice of Allowance dated Feb. 18, 2011, received in U.S. Appl. No. 11/850,011.

Office Action dated Mar. 4, 2011, received in European Application No. 07 814 689.1, which corresponds to U.S. Appl. No. 11/850,638.

Office Action dated Mar. 14, 2011, received in U.S. Appl. No. 11/969,809.

Final Office Action dated Jul. 14, 2011, received in U.S. Appl. No. 11/969,809.

Office Action dated Apr. 13, 2011, received in U.S. Appl. No. 11/969,912.

Office Action dated Apr. 15, 2011, received in U.S. Appl. No. 12/242,851.

Examiner's Report dated May 18, 2011, received in Australian Patent Application No. 2009204252, which corresponds to U.S. Appl. No. 12/242,851.

(56) References Cited

OTHER PUBLICATIONS

Office Action dated Jun. 10, 2011, received in European Patent Application No. 09 700 333.9, which corresponds to U.S. Appl. No. 12/242,851.
Office Action dated Apr. 18, 2011, received in U.S. Appl. No. 12/217,029.
Office Action dated Nov. 13, 2009 received in U.S. Appl. No. 12/364,470.
Office Action dated Mar. 4, 2011, received in U.S. Appl. No. 12/364,470.
Office Action dated Aug. 24, 2011, received in Chinese Patent Application No. 200880112570.2, which corresponds to U.S. Appl. No. 11/849,938.
Office Action dated Aug. 8, 2011, received in Korean Patent Application No. 10-2010-7007258, which corresponds to U.S. Appl. No. 11/849,938.
Apple, "Welcome to Tiger," copyright © 2005 Apple Computer, Inc., 32 pages, http://manuals.info.apple.com/en/Welcome_to_Mac_OS_X_v10.4_Tiger.pdf.
Delltech, "Working with Graphics," Windows XP: The Complete Reference, Chapter 18, Apr. 5, 2005, 4 pages.
Widgipedia, "I Need a Bog and a Forum Please?" 2 pages, printed Oct. 19, 2006, http://www.widgipedia.com/widgets/details/adni18/hyalo-weather_27.html.
International Search Report and Written Opinion dated Jul. 8, 2008 for International Application No. PCT/US2007/077639, which corresponds to U.S. Appl. No. 11/850,010, 11 pages (Omernick).
International Search Report and Written Opinion dated Nov. 27, 2009, received in International Application No. PCT/US2008/074341, which corresponds to U.S. Appl. No. 11/850,005, 25 pages (Chaudhri).
Office Action dated May 2, 2011, received in U.S. Appl. No. 11/850,010, 12 pages (Omernick).
Final Office Action dated Oct. 17, 2011, received in U.S. Appl. No. 11/850,010, 11 pages (Omernick).
Office Action dated May 16, 2012, received in U.S. Appl. No. 11/850,010, 12 pages (Omenick).
Cha, B., "HTC Touch (Sprint)," CNET Reviews; Nov. 6, 2007, http://web.archive.org/web/20071106065114/http://reviews.cnet.com/smartphones/htc-touch-sprint/4505-6452_7-3267123.html, 10 pages.
Gade. L., "HTC Touch (Sprint)—MobileTechReview," Smartphone Reviews by Mobile Tech Review, Nov. 2, 2007, http://www.mobiletechreview.com/phones/HTC-Touch.htm, 7 pages.
SnapFiies, "Dexpot," SnapFiles.comn, Oct. 10, 2007, 3 pages.
Zhang et al., "An Ergonomics Study of Menu-Operation on Mobile Phone Interface," in Proceedings of the Workshop on intelligent Information Technology Application; Dec. 2007, 5 pages.
Office Action dated Nov. 1, 2012, received in Chinese Patent Application No. 200780041309.3, which corresponds to U.S. Appl. No. 11/850,011, 5 pages (Forstall).
Office Action dated Sep. 20, 2012, received in U.S. Appl. No. 12/242,651, 21 pages (Herz).
Office Action dated Oct. 26, 2012, received in Chinese Patent Application No. 200980000229.2, which corresponds to U.S. Appl. No. 12/242,851, 22 pages (Herz).
Summons to oral proceedings dated Sep. 21, 2012, received in European Patent Application No. 09700333.9 which corresponds to U.S. Appl. No. 12/242,851, 4 pages (Herz).
Final Office Action dated Oct. 5, 2012, received in U.S. Appl. 12/217,029, 32 pages (Anzures).
Office Action dated Oct. 26, 2012, received in Japanese Patent Application No. 2010-524102, which corresponds to U.S. Appl. No. 11/849,938, 4 pages (Chaudhri).
Office Action dated Nov. 13, 2012, received in U.S. Appl. No. 13/104,903, 21 pages, (Forstall).
Final Office Action dated Sep. 14, 2012, received in U.S. Appl. No, 11/850,005, 22 pages (Chaudhri).
Decision to Grant dated Aug. 6, 2012, received in Chinese Pantent Application No. 200880110709.X, which corresponds to U.S. Appl. No. 11/850,005, 2 pages (Chaudhri).
Chartier, D., "iPhone 1.1.3 Video Brinas the Proof," ars technica. Dec. 30, 2007, http://arstechnica.com/journals/apple.are/2007/12/30/iphone-1-1-3-video-brings-the-proof, 3 pages.
Office Action date Nov. 30, 2011, received in Chinese Patent Application No. 200910173272.0, which correponds to U.S. Appl. No. 11/459,602, 8 pages (van Os).
Office Action dated Dec. 13, 2011, received in European Patent Application No. 09 170 697.8, which corresponds to U.S. Appl. No. 11/850,630, 5 pages (van Os).
Summons to attend oral proceedings dated Dec. 1, 2011, received in European Patent Application No. 07814689.1, which corresponds to U.S. Appl. No. 11/850,011, 6 pages (Forstall).
Final Office Action dated Oct. 31, 2011, received in U.S. Appl. No. 11/969,912, 14 pages (Lemay).
Final Office Action dated Dec. 12, 2011, received in U.S. Appl. No. 12/242,851, 17 pages (Herz).
Notification of Acceptance dated Oct. 17, 2011, received in Australian Patent Application No. 2009204252, which corresponds to U.S. Appl. No. 12/242,851, 3 pages (Herz).
Office Action dated Oct. 21, 2011, received in Australian Patent Application No. 2011101194, which corresponds to U.S. Appl. No. 12/242,851, 2 pages (Herz).
Office Action dated Nov. 30, 2011, received in Chinese Patent Application No. 200980000229.2, which corresponds to U.S. Appl. No. 12/242,851, 24 pages (Herz).
Office Action dated Jan. 25, 2012, received in U.S. Appl. No. 12/217,029, 24 pages (Anzures).
Final Office Action dated Oct. 19, 2011, received in U.S. Appl. No. 12/364,470, 25 pages (van Os).
Notice of Acceptance dated Dec. 14, 2011, received in Australian Patent Application No. 2008296445, which coresponds to U.S. Appl. No. 11/849,938, 3 pages (Chaudhri).
Office Action dated Feb. 13, 2012, received in Japanese Patent Application No. 2010-524102, which corresponds to U.S. Appl. No. 11/849,938, 2 pages (Chaudhri).
Dodge et al., "Microsoft Office Excel 2003 Office Manual," Microsoft Press, Jul. 12, 2004, vol. 1, p. 66-68, Unable to Locate English Translation.
Office Action dated Jan. 20, 2012, received in Japanese Patent Application No. 2009-51921, which corresponds to U.S. Appl. No. 11/850,630.
Office Action dated Jan. 20, 2012, received in Japanese Patent Application No. 2008-548858, which corresponds to U.S. Appl. No. 11/850,630, 5 pages (van Os).
Office Action dated Jan. 18, 2012, received in Chinese Patent Application No. 200780041309.3, which corresponds to U.S. Appl. No. 11/850,911, 15 pages (Forstall).
Certification of Australian Innovation Patent No. 2011101194 dated Mar. 2, 2012, which corresponds to U.S. Appl. No. 12/242,851, 4 pages (Herz).
Agarawala et al. "Database Compendex/E1," Engineering Information, Inc., Apr. 27, 2006, 1 page.
Agarawala et al., "Keepin' it Real: Pushing the Desktop Metaphor with Physics, Piles and the Pen," CHI Proceedings 2006, Apr. 22-27, 2006, Montréal, Québec, Canada, pp. 1283-1292.
Andrew's Widgets, "Developing Dashboard Widgets—What the Heck is a Widget," printed Jan. 25, 2008, 9 pages, http://andrew.hedges.name/widgets/dev/.
Anonymous, "Asus Eee PC Easy Mode Internet Tab Options," asuseeehacks.blogspot.com, Nov. 10, 2007, 33 pages, http://asuseeehacks.blogspot.com/2007/11/asus-eee-pc-user-interface-tour.html.
Anonymous, "Desktop Icon Toy—History," Oct. 8, 2009, 2 pages, http://www.idesksoft.com/history.html.
Apple.com, "Tiger Developer Overview Series—Developing Dashboard Widgets," printed Jun. 23, 2006, 9 pages, http://developer.apple.com/macosx/dashboard.html.
Jan. 10, 2006, Apple Computer, Inc., "Dashboard Tutorial," Apple Computer, Inc. © 2004, 2006, 24 pages.

(56) References Cited

OTHER PUBLICATIONS

Berka, J., "iFuntastic 3 Opens Up New iPhone Functionality," ars technica, Aug. 30, 2007, http://arstechnica.com/journals/apple.ars/2007/08/30/ifuntastic-3-opens-up-new-iphone-functionality.
Chartier, D., "iPhone 1.1.3 Video Brings the Proof," ars technica, Dec. 30, 2007, http://arstechnica.com/journals/apple.are/2007/12/30/iphone-1-1-3-video-brings-the-proof.
CNET, "Video:Create custom widgets with Web Clip," CNET News, Aug. 8, 2006, 3 pages, http://news.cnet.com/1606-2-6103525.html.
Aug. 2001, Domshlak, C., et al. "Preference-Based Configuration of Web Page Content," Proceedings of the 17th Int'l Joint Conf. on Artificial Intelligence (IJCAI), pp. 1451-1456, Seattle, WA.
Edwards, A., "iPhone 1.1.3 Firmware Feature Gallery," Gear Live, Dec. 28, 2007, http://www.gearlive.com/news/article/q407-iphone-113-firmware-feature-gallery/.
Fondantfancies, "Dash Clipping: Don't wait for Mac OS X 10.5 Leopard," fondantfancies.com, Aug. 8, 2006, 9 pages, http://www.fondantfancies.com/blog/3001239/.
Hesseldahl, A., "An App the Mac can Brag About," Forbes.com, Dec. 15, 2003, 2 pages, http://www.forbes.com/2003/12/15/cx_ah_1215tentech_print.html.
Dec. 13, 2007, iPhone Dev Wiki, "IPhone Customization," http://iphone.fiveforty.net/wiki/index.php/Iphone_Cutomization.
iPhone Hacks, "iPhone Firmware 1.1.1: Multi-Page SpringBoard Hack," Oct. 10, 2007, 4 pages, http://www.iphonehacks.com/2007/10/springboardhack.html.
Oct. 22, 2007, iPhone Hacks, "SummerBoard for iPhone OS v1.1.1: iPhone Hack Enables Scrolling of iPhone's Home Screen," http://www.iphonehacks.com/2007/10/summerboard-v3.html.
Oct. 11, 2007, iPhone Info, "Modifying the iPhone SpringBoard," http://iphoneinfo.ca/modifying-the-iphone-springboard.
Jazzmutant, "Jazzmutant Lemur," printed Nov. 16, 2005, 3 pages, http://64.233.167.104/search?q=cache:3g4wFSaZiXIJ:www.nuloop.c.
Jazzmutant, "The Lemur: Multitouch Control Surface", printed Nov. 16, 2005, 3 pages http://64233.167.104/search?q=cache:j0_nFbNVzOcJ:www.cycling7.
Macworld, "Whip up a widget," Macworld.com., Sep. 23, 2005, 5 pages, http://www.macworld.com/article/46622/2005/09/octgeekfactor.htm.
Macworld, "First Look: Leopard first looks: Dashboard," Aug. 9, 2006, 3 pages, http://www.macworld.com/article/52297/2005/08/leodash.html.
Mello, Jr., J.,"Tiger's Dashboard Brings Widgets to New Dimension." MacNewsWorld, printed Jun. 23, 2006, 3 pages, http://www.macnewsworld.com/story/42630.html.
Microsoft, "Right-Clicking with a Pen," microsoft.com, Nov. 7, 2002, 3 pages, http://www.microsoft.com/windowsxs/using/tabletpc/learnmore/rightclick.mspx.
MountFocus Information Systems, "An Onscreen Virtual Keyboard: touchscreen, kiosk and Windows compatible," printed Dec. 19, 2007, 3 pages, http://www.virtual-keyboard.com.
Opera Software, "Welcome to Widgetize," Copyright © 2006 Opera Software ASA, 1 page, http://widgets.opera.com/widgetize.
Sadun, E., "Erica's Documentation: Applications and Utilities for the iPhone and iPod Touch," Copyright 2007, http://ericasadun.com/ftp/Deprecated/Documentation/Manual-0.04.pdf.
Thomas et al., "Applying Cartoon Animation Techniques to Graphical User Interfaces," ACM Transactions on Computer-Human Interaction, vol. 8, No. 3, Sep. 2001, pp. 198-222.
Nov. 2005, Tidwell, J., "Animated Transition," from Designing Interfaces, pp. 84-85, Copyright © 2006 O'Reilly Media, Inc.
tuaw.com, "Springboard Scrolling," new page dot feature, Oct. 9, 2007, http://www.tuaw.com/gallery/springboard-scrolling/431347/.
tuaw.com, "Springboard Scrolling," mid-scroll, Oct. 9, 2007, http://www.tuaw.com/photos/springboard-scrolling/731348/.
tuaw.com. "Springboard Scrolling," mostly unpopulated page, Oct. 9, 2007, http://www.tuaw.com/photos/springboard-scrolling/431349/.
tuaw.com, "TUAW Hack: Mess with Your iPhone Settings," Dec. 18, 2007, http://www/tuaw.com/tag/SpringBoard/.
tuaw.com, "1.1.1 iPhone Multipage Springboard Hack," posted Oct. 9, 2007, http://www.tuaw.com/2007/10/09/1-1-1-iphone-multipage-springboard-hack/.
Nvo. 3, 2007, VRBA, J., "iPhone Customizations and Applications," Ezine Articles, http://ezinearticles.com/?iPhone-Customizations-and-Applications&id-815807&opt=print.
Wildarya, "iDesksoft Desktop Icon Toy v2.9," Oct. 16, 2007, 4 pages, http://www.dl4all.com/2007/10/16/idesksoft_desktop_icon_toy_v2.9.html.
International Search Report and Written Opinion for International Application No. PCT/US2007/077643, mailed May 8, 2008.
International Search Report and Written Opinion for International Application No. PCT/US2008/050431, mailed Jun. 17, 2008.
Invitation to Pay Additional Fees dated Nov. 16, 2009, received in International Patent Application No. PCT/US2009/030225, which corresponds to U.S. Appl. No. 12/242,851.
International Search Report and Written Opinion dated Feb. 25, 2010, received in International Application No. PCT/US2009/030225, which corresponds to U.S. Appl. No. 12/242,851.
International Preliminary Report on Patentability dated Jul. 15, 2010, received in International Application No. PCT/US2009/030225, which corresponds to U.S. Appl. No. 12/242,851.
International Preliminary Report on Patentability dated Mar. 18, 2010, received in International Application No. PCT/US2008/074625, which corresponds to U.S. Appl. No. 11/849,938, 7 pages.
Office Action dated Sep. 14, 2009, received in Australian Patent Application 2009100812, which corresponds to U.S. Appl. No. 11/459,602.
Office Action dated Sep. 14, 2009, received in Australian Patent Application No. 2009100813, which corresponds to U.S. Appl. No. 11/459,602.
Office Action dated Apr. 2, 2009, received in Canadian Patent Application No. 2,633,759, which corresponds to U.S. Appl. No. 11/459,602.
Office Action dated Dec. 10, 2009, received in Canadian Application No. 2,633,759, which corresponds to U.S. Appl. No. 11/459,602.
Office Action dated Mar. 30, 2010, received in Chinese Application for Invention No. 200680053441.1, which corresponds to U.S. Appl. No. 11/459,602, 5 pages.
Office Action dated Oct. 27, 2009, received in German Patent Application No. 11 2006 003 600.9, which corresponds to U.S. Appl. No. 11/459,602.
Office Action dated Oct. 13, 2008, received in European Application No. 06 846 840.4, which corresponds to U.S. Appl. No. 11/459,602.
Examiner's Report dated Apr. 20, 2010, received in Australian Patent Application No. 2009204252, which corresponds to U.S. Appl. No. 12/242,851.
Final Office Action dated May 5, 2010, received in U.S. Appl. No. 12/364,470.
Office Action dated Aug. 11, 2010, received in U.S. Appl. No. 11/850,011.
Extended European Search Report dated Feb. 1, 2013, received in European Patent Application No. 12177813.8, which corresponds to U.S. Appl. No. 11/850,011, 6 pages (Forstall).
European Search Report dated Jan. 16, 2013, received in European Patent Application No. 12194312.0, which corresponds to U.S. Appl. No. 12/242,851, 8 pages (Herz).
European Search Report dated Jan. 16, 2013, received in European Patent Application No. 12194315.3, which corresponds to U.S. Appl. No. 12/242,851, 7 pages (Herz).
European Search Report dated Dec. 18, 2012, received in European Patent Application No. 12189764.9, which corresponds to U.S. Appl. No. 11/849,938, 5 pages (Chaudhri).
Notice of Acceptance dated Aug. 20, 2012, received in Australian Patent Application No. 2010200763, which corresponds to U.S. Appl. No. 11/459,602, (van Os).
Office Action dated Apr. 18, 2013, received in Canadian Patent Application No. 2,633,759, 2 pages (van Os).
Summons to attend oral proceedings dated Apr. 22, 2013, received in European Patent Application No. 09170697.8, which corresponds to U.S. Appl. No. 11/459,602, 6 pages (van Os).

(56) References Cited

OTHER PUBLICATIONS

Examiner's Pre-Review dated May 31, 2013, received in Japanese Patent Application No. 2009-051921, which corresponds to U.S. Appl. No. 11/459,602, 7 pages (van Os).
Final Office Action dated Feb. 15, 2013, received in U.S. Appl. No. 11/850,010, 2 pages (Omernick).
Notice of Allowance dated Apr 26, 2013, received in U.S. Appl. No. 11/969,809, 23 pages (Platzer).
Final Office Action dated May 10, 2013, received in U.S. Appl. No. 12/242,851, 33 pages (Herz).
Office Action dated Aug. 19, 2013, received in U.S. Appl. No. 12/217,029, 10 pages (Anzures).
Office Action dated Feb. 20, 2013, received in Chinese Patent Applicaton which corresponds to U.S. Appl No. 11/849,938, 5 pages (Chaudhri).
Decision to Grant dated May 31, 2013, received in Japanese Patent Application No. 2010-524102 which corresponds to U.S.Appl. No. 11/849,938 3 pages (Chaudhri).
Office Action dated Jan. 30, 2013, received in Koran Patent Application No. 1020107007258, which corresponds to U.S. Appl. No. 11/849,938, 4 pages (Chaudhri).
Notice of Allowance dated Apr. 29. 2013, received in U.S. Appl. No. 13/104,903, 8 pages (Forstall).
Office Action dated Feb. 20, 2013 received in U.S. Appl. 13/104,911, 25 pages (Forstall).
Notice of Allowance dated Jun. 10, 2013, received in U.S. Appl. No. 13/104,911, 6 pages (Forstall).
ISO 9241-10:1996 Ergonomic requirements for office work with visual display terminals (VDTs)—Part 10: Dialogue principles, International Standard—ISO, Zuerich, CH, vol. 9241-10, May 1, 1996, 18 pages.
ISO 9241-11:1998 Ergonomic requirements for office work with visual display terminals (VDTs)—Part 11: Guidance on usabiiity, International Standard—ISO, Zuerich, CH, vol. 9241-11, Jan. 1, 1998, 28 pages.
ISO 9241-12:1998 Ergonomic requirements for office work with visual display terminals (VDTs)—Part 12. Presentation of information, International Standard—ISO, Zuerich, CH, vol. 9241-12, Dec. 1, 1998, 52 pages.
RealNetworks, "Transition Effects," RealNetworks Production Guide, 2001, http://service.real.com/help/library/guides/productionguidepreview/HTML/htmfiles/transit.htm, 21 pages.
Intention to Grant dated Oct. 23, 2012, received in Chinese Patent Application No. 200910173272.0, which corresponds to U.S. Appl. No. 11/459,602, 1 pages (van Os).
Patent Grant dated Sep. 24, 2012, received in Japanese Patent Application No. 2008-548858, which corresponds to U.S. Appl. 11/450,602, 3 pages (van Os).
Office Action dated Sep. 24, 2012, received in Japanese Patent Application No. 2009 051921; which corresponds to U.S. App. No. 11/459,602, 3 pages (van Os).
Office Action dated Jul. 2, 2013, received in Chinese Patent Application No. 200780041309.3, which corresponds to U.S. Appl. No. 11/850,011, 12 pages (Forstall).
Office Action dated Sep. 10, 2013, received in U.S. Appl. No. 11/969,912, 20 pages (Lemay).
Office Action dated Jul. 2, 2013, received in Chinese Patent Application No. 200980000229.2, which corresponds to U.S. Appl. No. 12/242,851, 4 pages (Herz).
Grant Notice dated Jun. 20, 2013, received in European Patent Application No. 09 700 333.9, which corresponds to U.S. Appl. No. 12/242,851, 7 pages (Herz).
Office Action dated Aug. 12, 2013, received in Australian Patent Application No. 2012202140, which corresponds to U.S. Appl. No. 11/849,938, 2 pages (Chaudhri).
Office Action dated Aug. 2, 2013, received in European Patent Application No. 08 829 660.3, which corresponds to U.S. Appl. No. 11/849,938, 7 pages (Chaudhri).
Summons to attend oral arguments dated Aug. 30, 2013, received in European Patent Application No. 08798713.7, which corresponds to U.S. Appl. No. 11/850,005, 15 pages (Chaudhri).

\* cited by examiner

EDITING INTERFACE

TECHNICAL FIELD

The disclosed embodiments relate to graphical user interfaces.

BACKGROUND

As portable devices become more compact, and the amount of information to be processed and stored increases, it has become a significant challenge to design a user interface that allows users to easily interact with the device. This is unfortunate since the user interface is the gateway through which users receive not only content but also responses to user actions or behaviors, including user attempts to access a device's features or tools. Some portable electronic devices (e.g., mobile phones) have resorted to adding more pushbuttons, overloading the functions of pushbuttons, or using complex menu systems to allow a user to access, store and manipulate functions or data. These conventional user interfaces often result in complicated key sequences and menu hierarchies that must be memorized by the user.

Many conventional user interfaces, such as those that include physical pushbuttons, are also inflexible. This is unfortunate because the inflexibility may prevent a user interface from being configured and/or adapted by either an application running on the portable device or by users. When coupled with the time consuming requirement to memorize multiple key sequences and/or menu hierarchies, such inflexibility is frustrating to many users.

Some conventional user interfaces can be configured by users, thereby allowing at least partial customization. Unfortunately, the process of modifying such conventional user interfaces is often as cumbersome and complicated as the use of the conventional user interface itself. In particular, the required behaviors during configuration of such conventional user interfaces are often counter intuitive and the corresponding indicators guiding user actions are often difficult to understand. These challenges are often a source of additional frustration for users.

SUMMARY

A portable electronic device displays icons (e.g., graphical objects) in one or more regions of a user interface of a touch-sensitive display, and detects user input specifying an exchange of positions of icons in the user interface. In some aspects, the respective positions of two icons in a user interface can be selected to exchange positions in the one or more regions of the user interface, and one or both icons can change their visual appearance to indicate their selection status.

In some implementations, a method includes: displaying a first icon in a first position in a touch-sensitive display; displaying a second icon in a second position of the touch-sensitive display; receiving first touch input specifying selection of the first icon; responsive to the first touch input, modifying the visual appearance of the first icon; receiving second touch input indicating movement of the first icon to within proximity of the second icon; and responsive to the second touch input, modifying the visual appearance of the second icon.

In some implementations, a method includes: displaying an icon in a first position of a touch-sensitive display; receiving first touch input specifying selection of the icon; responsive to the first touch input, modifying the visual appearance of the icon; receiving second touch input indicating movement of the icon to within proximity of a second position in the user interface; and responsive to the second touch input, modifying the visual appearance of the second position.

In some implementations, a method includes: displaying a first icon in a first page of a touch-sensitive display; receiving first touch input specifying selection of the first icon; responsive to the first touch input, modifying the visual appearance of the first icon; receiving second touch input indicating movement of the first icon to within proximity of an edge of the touch sensitive display; responsive to the second touch input, displaying a second page of the touch-sensitive display, the second page including a second icon; receiving third touch input indicating movement of the first icon to within proximity of the second icon; and responsive to the third touch input, modifying the visual appearance of the second icon.

DESCRIPTION OF EMBODIMENTS

Figure 1:
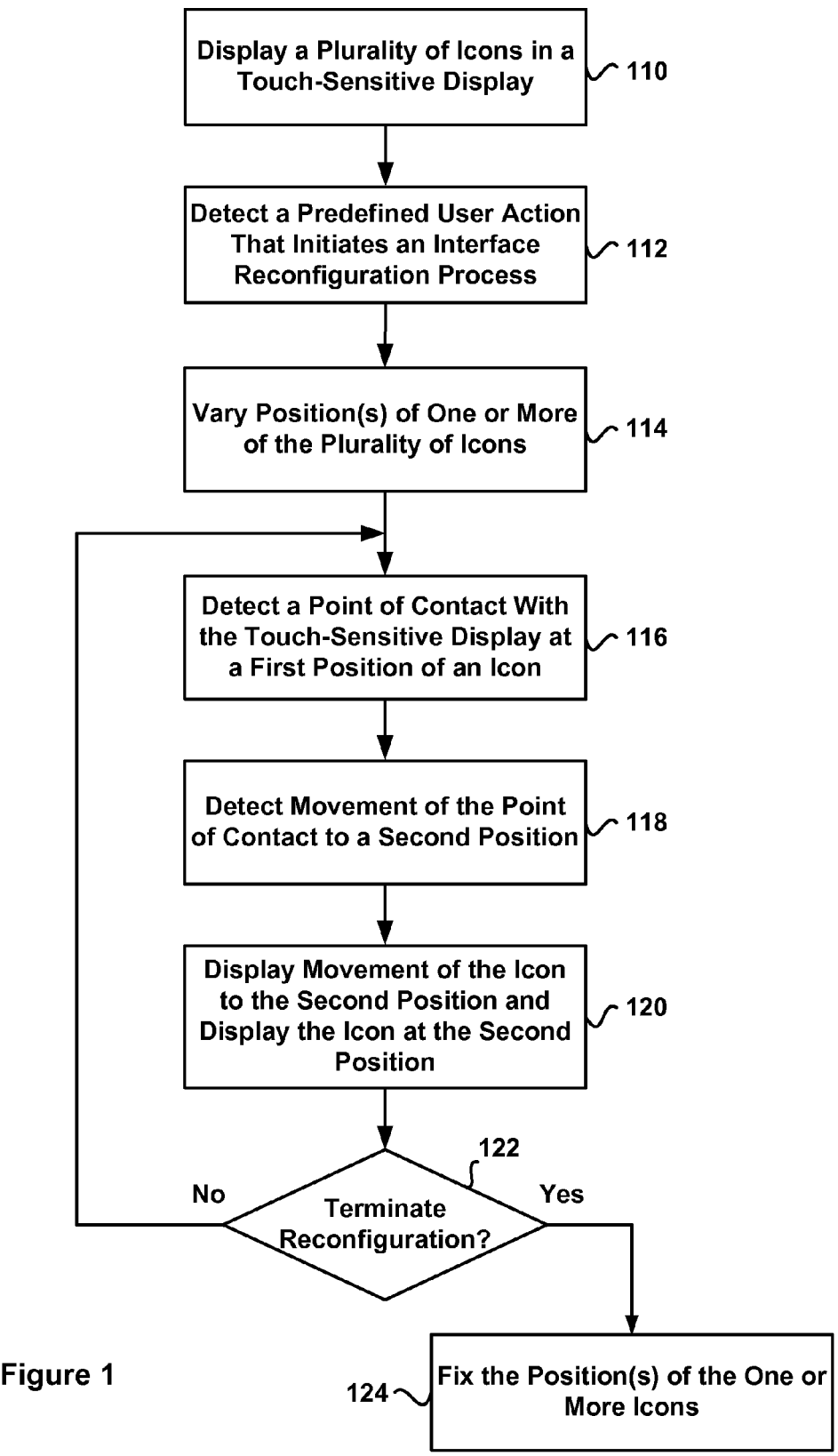
FIG. 1 is a flow diagram of one embodiment of a position adjustment process for a portable electronic device.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Overview of the Interface Reconfiguration Mode

Attention is directed towards embodiments of portable electronic devices, including portable communications devices, that have graphical user interfaces (GUIs). The portable devices include an interface reconfiguration mode. In response to a user initiating the interface reconfiguration mode, positions of one or more icons displayed on the portable device may be varied about respective average positions. The varying of the positions of the one or more icons may include animating the one or more icons to simulate floating of the one or more icons on a surface corresponding to a surface of a display in the portable device. The display may be a touch-sensitive display, which responds to physical contact by a stylus or one or more fingers at one or more contact points. While the following embodiments may be equally applied to other types of displays, a touch-sensitive display is used as an illustrative example.

The varying of the positions of the one or more icons may intuitively indicate to the user that the positions of the one or more icons may be reconfigured by the user. The user may modify, adapt and/or reconfigure the positions of the one or more icons. In embodiments where the portable device includes a touch-sensitive display, the user may make contact with the touch-sensitive display proximate to a respective icon at a first position. Upon making contact with the touch-sensitive display, the respective icon may cease varying its position. The user may drag the respective icon to a second position. Upon breaking contact with the touch-sensitive display, the respective icon may resume varying its position. In some embodiments, the display may include two regions. During the interface reconfiguration mode, positions of one or more icons displayed in the first region may be varied while positions of one or more icons displayed in the second region may be stationary.

The user may similarly modify, adapt and/or reconfigure the positions of additional icons during the interface reconfiguration mode. When the user has completed these changes (at least for the time being), he or she may terminate the interface reconfiguration mode. In response to this user action, the portable device may return to a normal mode of operation and the varying of the displayed positions of the one or more icons will cease.

The user may initiate or terminate the interface reconfiguration process by selecting one or more appropriate physical buttons on the portable device, by a gesture (such as making contact and swiping one or more fingers across the touch-sensitive display) and/or by selecting one or more soft buttons (such as one or more icons that are displayed on the touch-sensitive display). As used herein, a gesture is a motion of the object/appendage making contact with the touch screen display surface. In some embodiments, the interface reconfiguration process terminates a pre-defined time after the interface reconfiguration process is initiated, i.e., there is a time out.

The one or more icons displayed on the portable device may be graphical objects. In some embodiments, the one or more icons may be widgets, which are combinations of states and procedures that constitute on-screen representations of controls that may be manipulated by the user, such as bars, buttons and text boxes. In an exemplary embodiment, the one or more icons correspond to application programs (email, browser, address book, etc.) that may be selected by the user by contacting the touch-sensitive display proximate to an icon of interest.

FIG. 1 is a flow diagram of one embodiment of a position adjustment process 100 for a portable electronic device. While the position adjustment process 100 described below includes a number of operations that appear to occur in a specific order, it should be apparent that the process 100 can include more or fewer operations, which can be executed serially or in parallel (e.g., using parallel processors or a multi-threading environment), an order of two or more operations may be changed and/or two or more operations may be combined into a single operation.

In the position adjustment process 100, a plurality of icons are displayed in a GUI in a touch-sensitive display (110). A first predefined user action that initiates an interface reconfiguration process is detected (112). Exemplary predefined user actions include selecting a physical button on the portable device, making a predefined gesture on the touch screen display surface, or selecting a soft button. Position(s) of one or more of the plurality of displayed icons are varied (114). A point of contact with the touch-sensitive display at a first position of a respective icon is detected (116). Movement of the point of contact to a second position is detected (118). Movement of the respective icon to the second position is displayed and the respective icon is displayed at the second position (120).

If a second predefined user action that terminates the interface reconfiguration process is detected (122-yes), the position(s) of the one or more icons is fixed (124). Exemplary predefined user actions include selecting or deselecting a physical button on the portable device, making another predefined gesture on the touch screen display surface, or selecting or deselecting a soft button. The fixed position(s) may correspond to a respective average position(s) for the one or more icons. If a second pre-defined user action that terminates the interface reconfiguration process is not detected (122-no), the process may continue when a point of contact proximate to the same or another icon is detected (116).

Figure 2A:
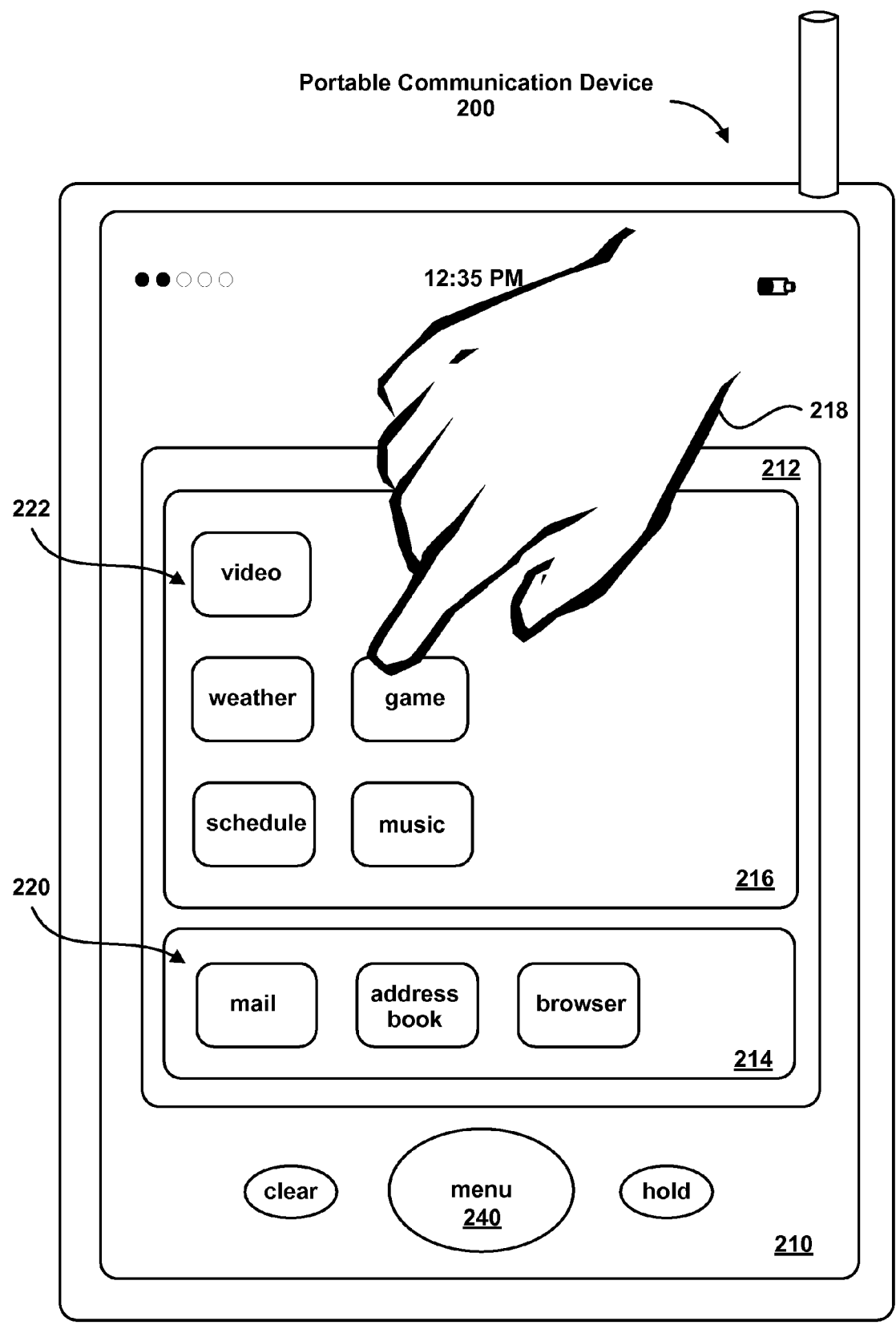
FIG. 2A is an illustration of one embodiment of a portable electronic device responsive to touch input for adjustment of the position of one or more icons.

FIG. 2A is an illustration of one embodiment of a portable electronic device 200 responsive to touch input for adjustment of the position of one or more icons. The portable electronic device 200 includes a touch-sensitive display with a GUI 210. The display surface is transparent to allow various graphical objects to be displayed to the user (e.g., widgets). In some embodiments, the GUI 210 is divided into multiple sections or windows. For example, a region 212 of GUI 210 may include a tray 216 for holding icons or graphical objects 222 representing functions that are frequently used by the user (e.g., video, weather, schedule, game, music, etc.) and a tray 214 for holding icons or graphical objects 220 representing functions that are used less frequently by the user (e.g., mail, address book, browser, etc.). The GUI 210 may also include graphical objects corresponding to high-level functions of the portable electronic device 200. For example, various objects and/or images may be presented and changed in GUI 210 by pressing a menu button 240. In embodiments that include a mobile phone, dedicated graphical objects can be presented in GUI 210 representing traditional voice and data service operations (e.g., hold, clear, etc.).

The user may interact with the portable communications device 200 by making contact with the display surface with GUI 210 using a stylus, a finger 218 (not drawn to scale in FIG. 2) or more than one finger. For example, the user may make contact with the display surface at a position of one of the icons 222 (direct contact), thereby activating the function or application program corresponding to that icon. In some embodiments, the icon 222 is activated when the user makes contact at the position of the icon and then breaks contact (for example, a tapping gesture). In some embodiments, the contact with the display surface used to activate the icon may not be at the position of the icon 222. Instead, contact may be proximate to the icon 222 (indirect contact). The latter technique is similar to "hot spots" used with Web pages and other computer user interfaces.

Figure 2B:
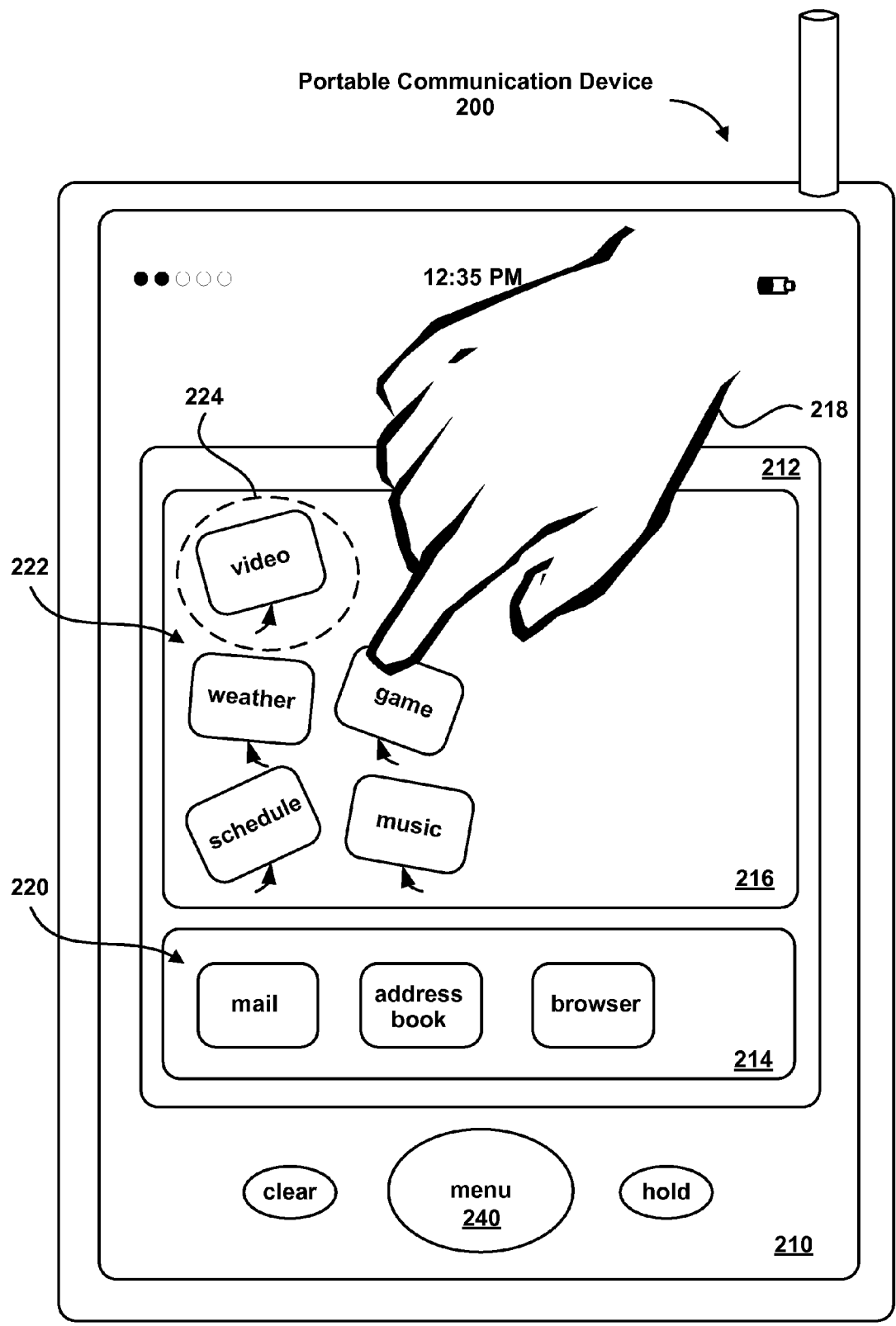
FIG. 2B is an illustration of one embodiment of a portable electronic device responsive to touch input for adjustment of the position of one or more icons.
Figure 2C:
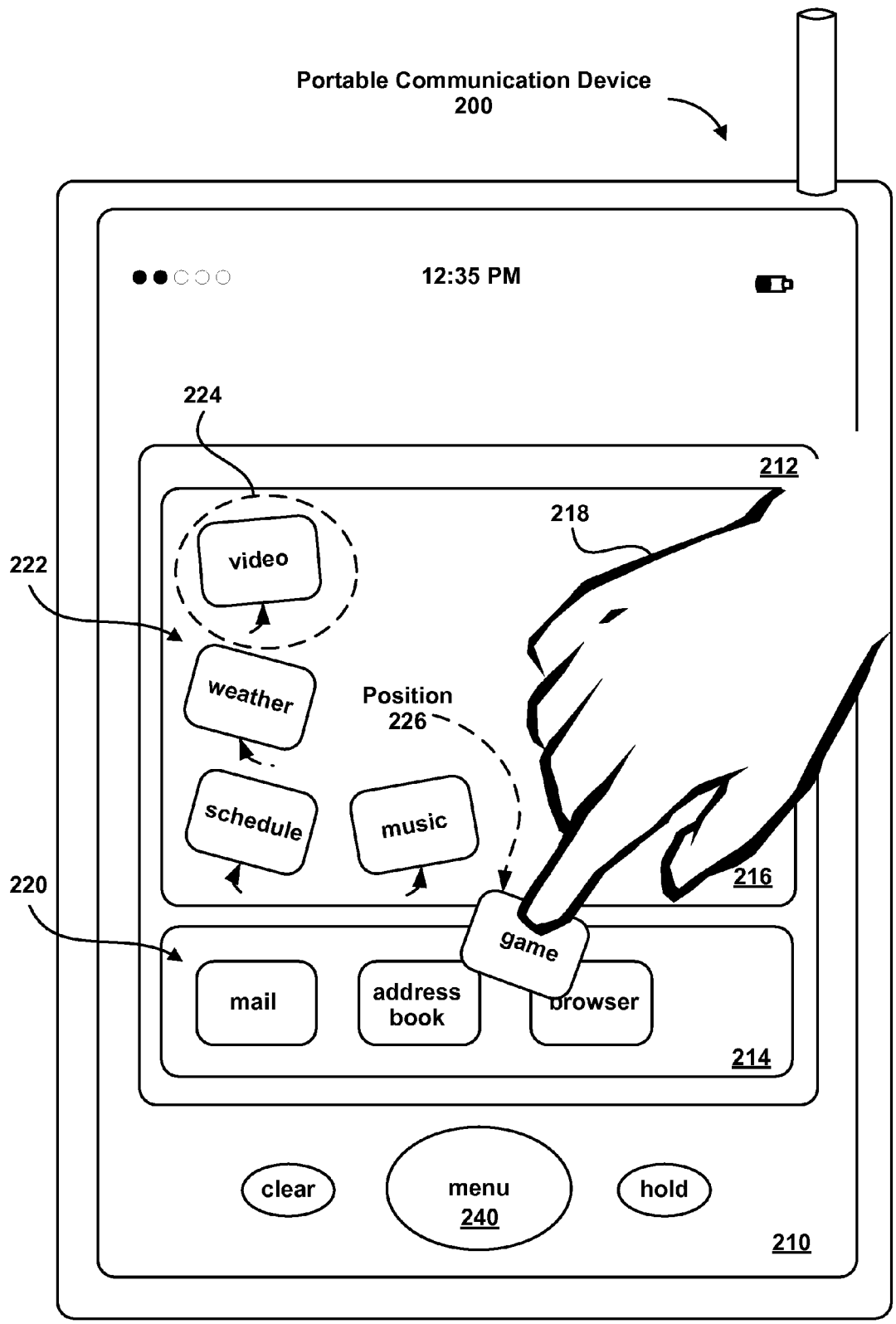
FIG. 2C is an illustration of one embodiment of a portable electronic device responsive to touch input for adjustment of the position of one or more icons.
Figure 2D:
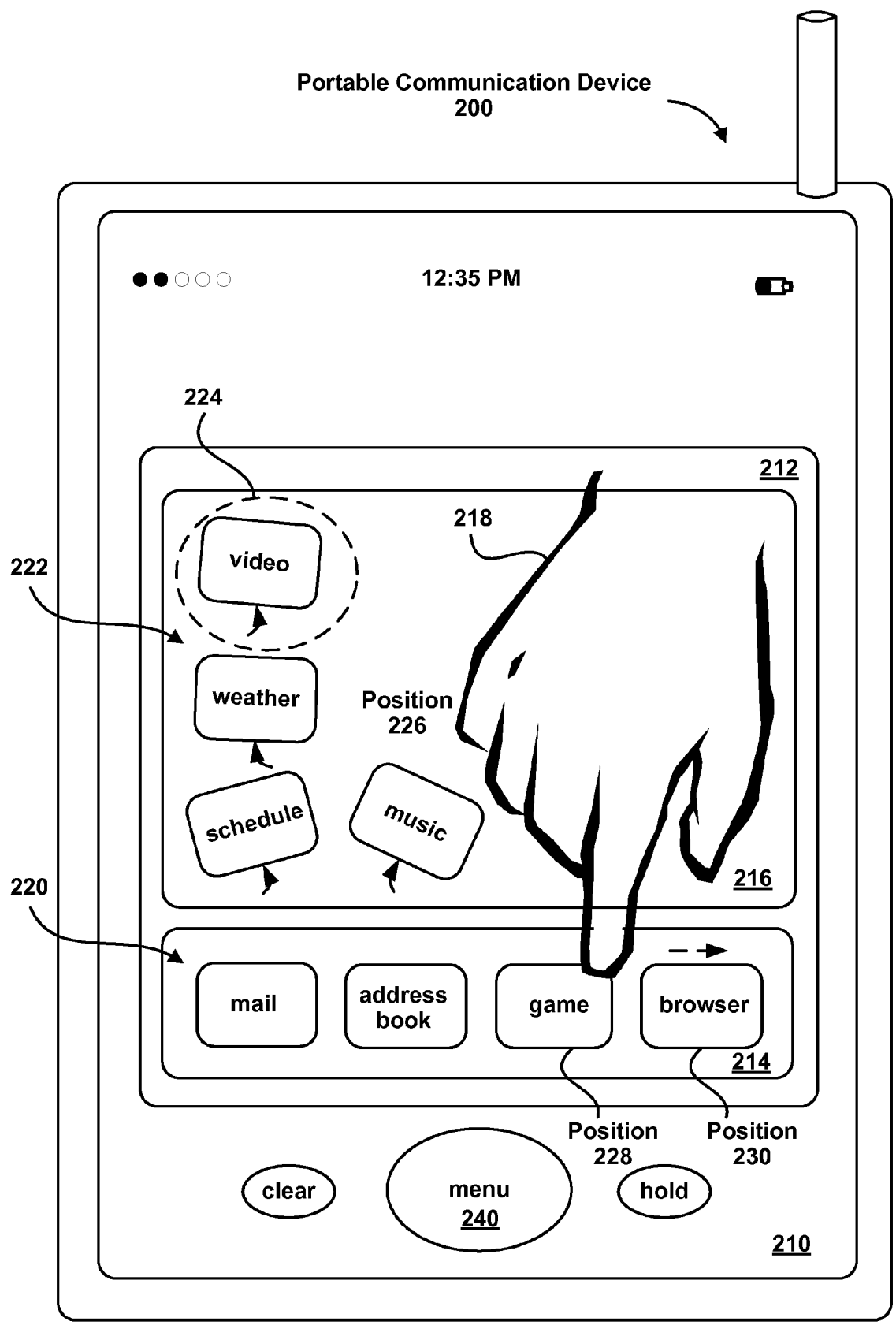
FIG. 2D is an illustration of one embodiment of a portable electronic device responsive to touch input for adjustment of the position of one or more icons.

FIGS. 2B-D show the portable electronic device 200 during the interface reconfiguration mode. After the interface reconfiguration mode is initiated, the display of one or more of the icons 222 in the tray 216 is modified from the previous stationary positions to time-varying positions. As noted previously, the display may include animating one or more of the icons 222 to simulate floating of one or more of the icons 222 on a surface corresponding to the display surface. For example, the animated varying of the positions of one or more of the icons 222 during the interface reconfiguration mode may resemble that of a hockey puck in an air hockey game. The displayed position(s) of a respective icon in the icons 222 may be varied in a region 224 centered on the average position of the respective icon.

While FIG. 2B-2D illustrates movement of one or more of the icons 222 in the tray 216, in other embodiments positions of one or more of the icons 220 in another region of GUI 210, such as tray 214, may be varied separately or in addition to those of one or more of the icons 222 in tray 216.

The time-varying position(s) of one or more of the icons 222 intuitively indicate to the user that the positions of one or more of the icons 222 may be modified. This is illustrated in FIGS. 2C-D, which show the portable electronic device 200 during the interface reconfiguration mode. The user makes contact, either direct or indirect, with one of the icons that is moving at a position 226 and moves the point of contact across the display surface with GUI 210. The contact and the motion are detected by the portable electronic device 200. As a consequence, the displayed icon, in this example corresponding to a game, is moved accordingly.

As shown in FIG. 2D, the user moves the game icon to position 228 and breaks contact with the display surface. The game icon is now displayed at the position 228. While the displayed position of the game icon is shown as stationary in FIG. 2D, in some embodiments the position of the game icon may be varied once the user breaks contact with the display surface. In some embodiments, only icons displayed in one or more subsections of the GUI 210 are displayed with a varying position during the interface reconfiguration mode. Thus, if the game icon had been dragged to another position in the tray 222, it may be displayed with a varying position after the user breaks contact with the display.

FIG. 2D also illustrates the optional displacement of the browser icon to position 230. The browser icon was displaced from its initial position 228 to its new position 230 due to at least partial overlap with the game icon, i.e., when the portable electronic device 200 determined that the user positioned the game icon over the browser icon, the displayed position of the browser icon was changed.

In other embodiments, an icon may be evicted or removed from the tray 214 when an additional icon, such as the browser icon, is added to the tray 214. For example, the tray 214 may be configured to accommodate a finite number of icons, such as 4 icons. If an additional icon is added to the tray 214, a nearest icon to the additional icon or an icon that at least partially overlaps the additional icon may be evicted or removed from the tray 214.

Figure 2E:
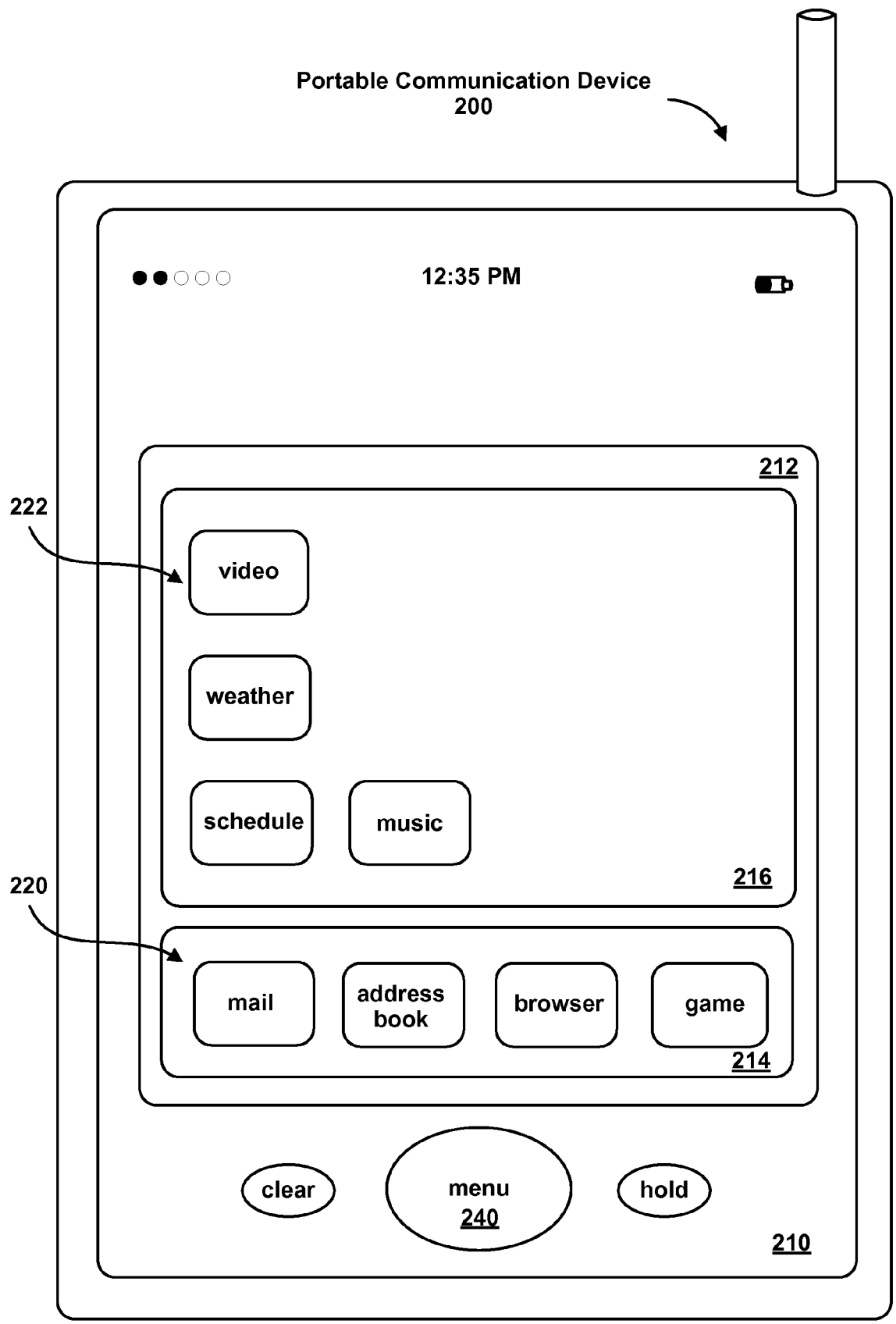
FIG. 2E is an illustration of one embodiment of a portable electronic device responsive to touch input for adjustment of the position of one or more icons.

FIG. 2E illustrates the portable electronic device 200 after the interface reconfiguration mode has been terminated or has terminated (due to a time out). The icons in GUI 210 have stationary positions. The game icon and the browser icon are displayed in their new positions in the tray 214.

The animated effects during the interface reconfiguration mode, such as the varying position(s) of one or more of the icons 222, may be in accordance with corresponding equations of motion for one or more of the icons in a plane substantially coincident with the display surface with GUI 210. The equations of motion may have a coefficient of friction less than a threshold allowing the simulation and/or animation of floating or sliding of one or more of the icons. The equation of motion for the respective icon may have a non-zero initial velocity, a non-zero angular velocity, and/or a restoring force about the respective average position of the respective icon such that the position of the respective icon oscillates in the region 224 (FIG. 2D) substantially centered on the respective average position of the respective icon.

Figure 3A:
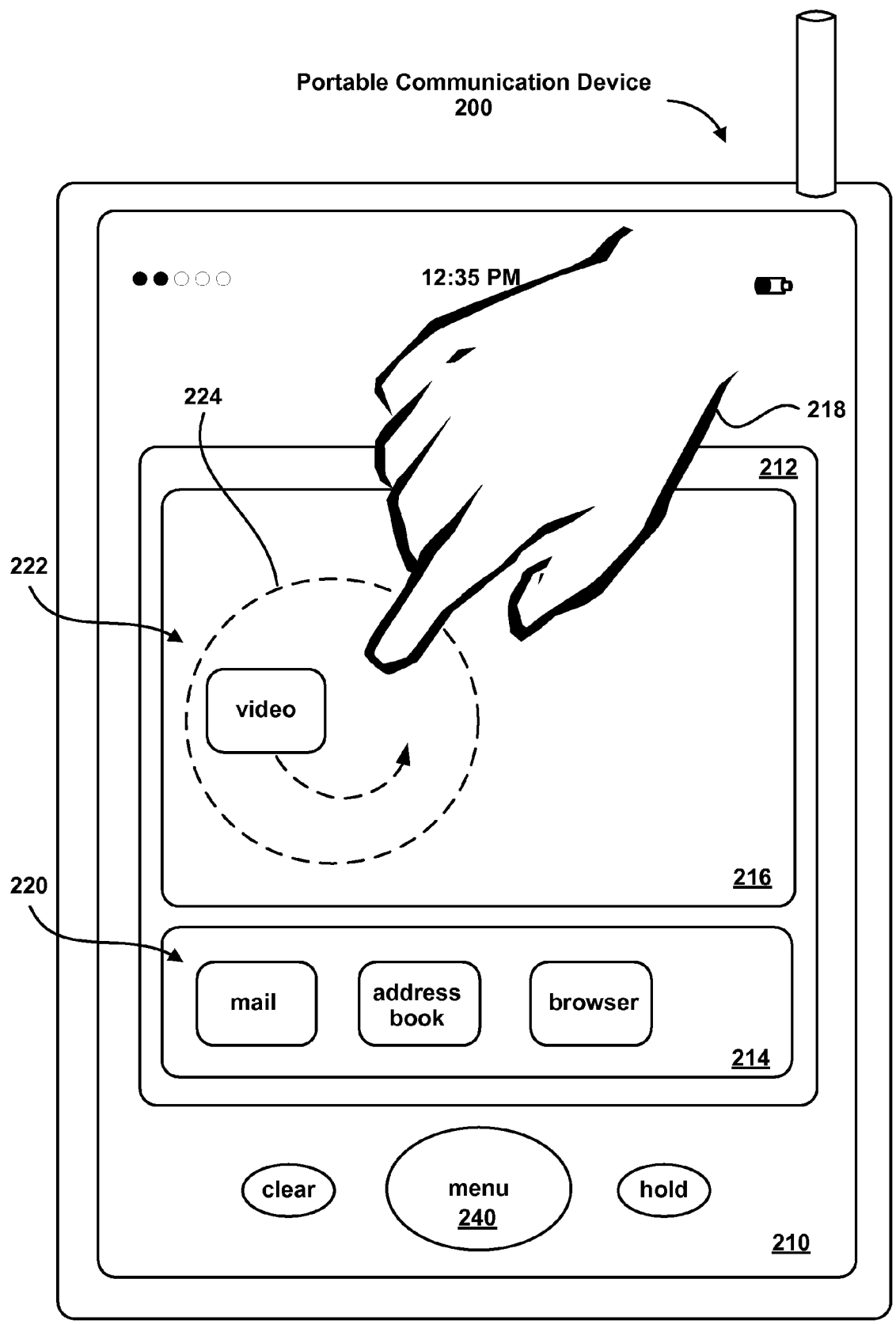
FIG. 3A is an illustration of one embodiment of a portable electronic device responsive to touch input for adjustment of the position of one or more icons.
Figure 3B:
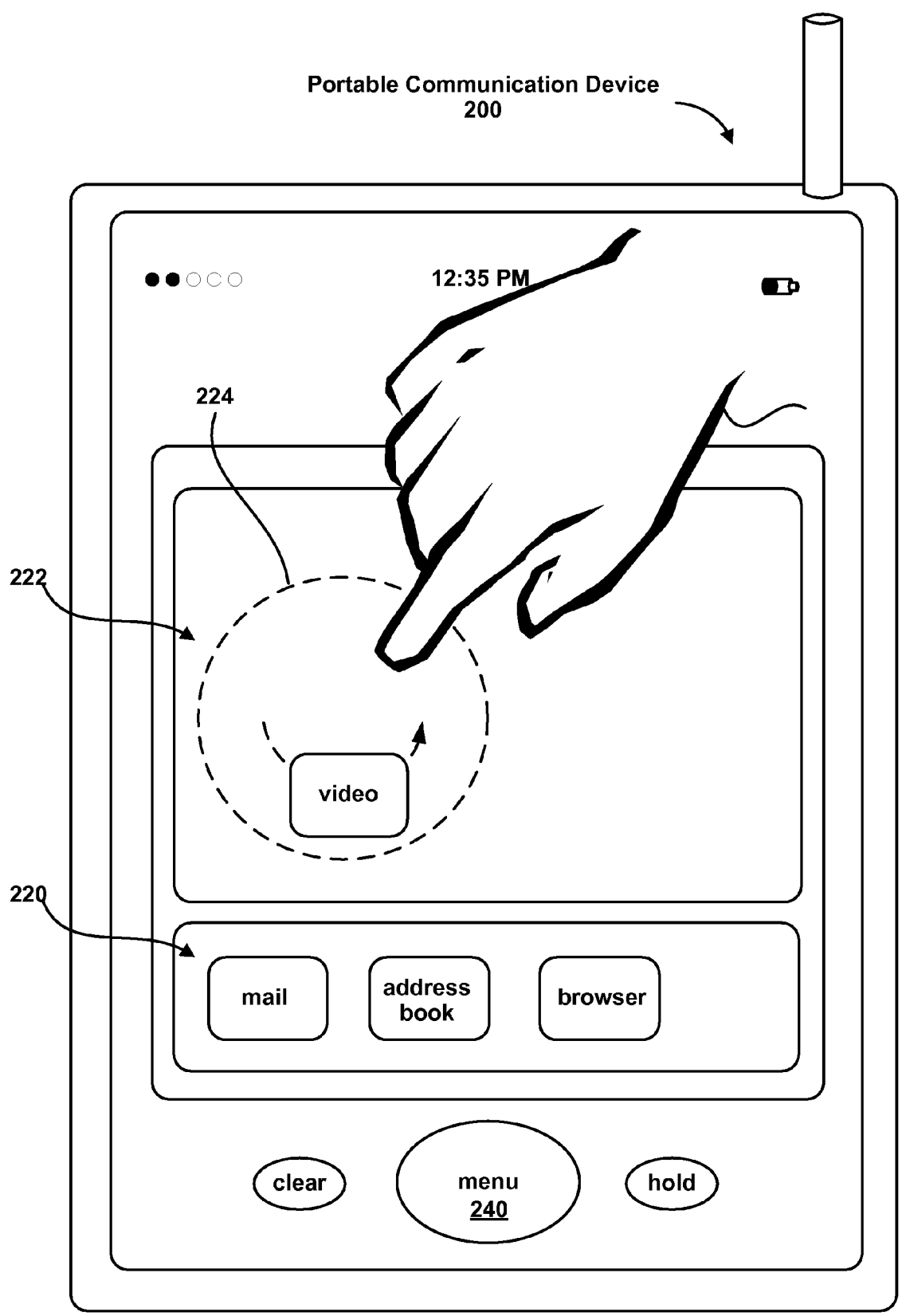
FIG. 3B is an illustration of one embodiment of a portable electronic device responsive to touch input for adjustment of the position of one or more icons.

In some embodiments, the position of the respective icon may be varied during the interface reconfiguration mode in such a way that the respective icon rotates about the respective average position of the respective icon while maintaining a fixed orientation with respect to the GUI 210 and the portable electronic device 200. This is illustrated in FIGS. 3A and 3B, which show the portable electronic device 200 during the interface reconfiguration mode. In this example, the position of the video icon 222 in tray 216 is varied in such a way that it maintains a fixed orientation in region 224. This may make it easier for the user to determine the function of the respective icon during the interface reconfiguration mode.

Portable Electronic Device Architecture

Figure 4:
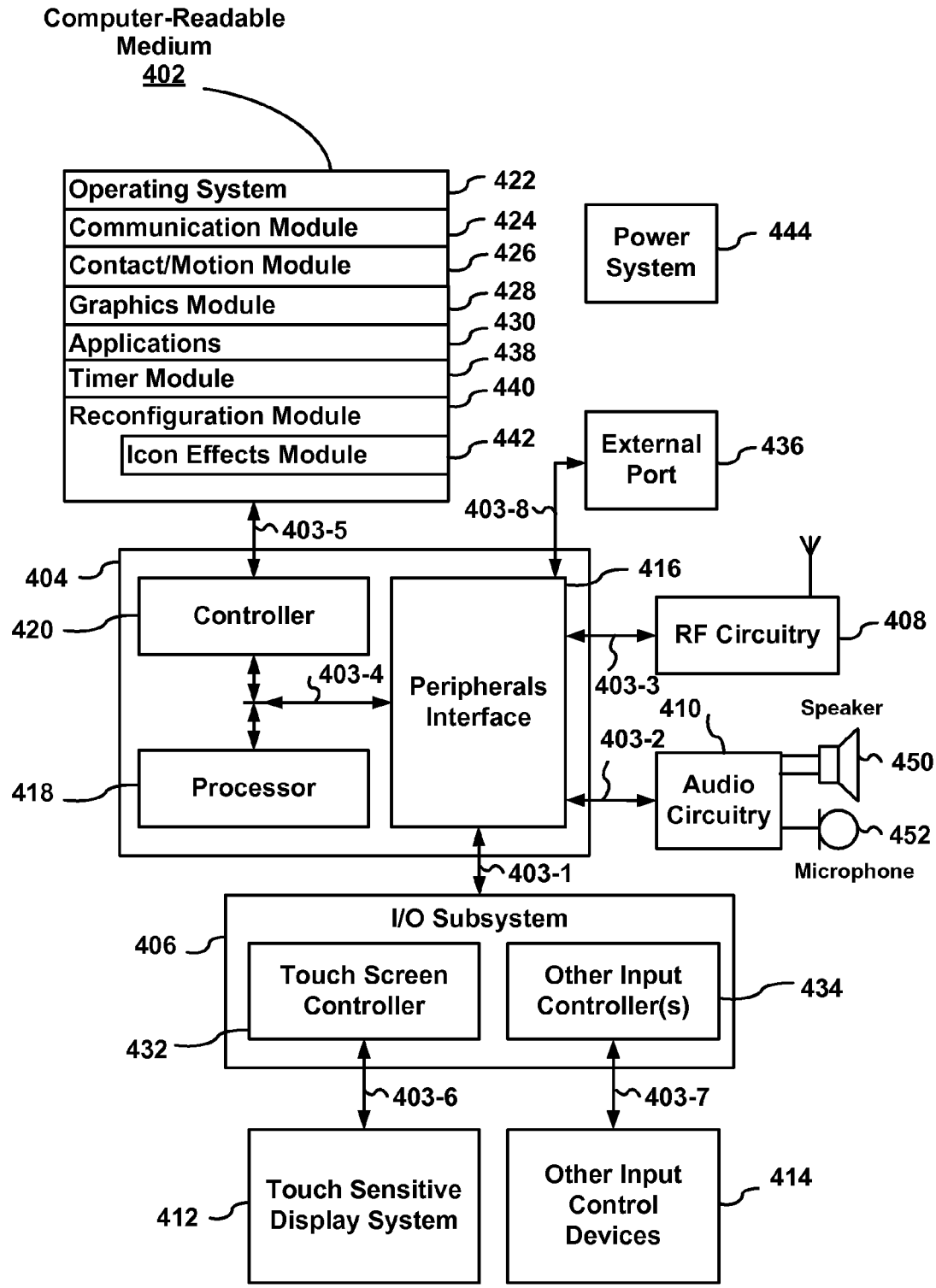
FIG. 4 is a block diagram of one embodiment of a portable electronic device.

Attention is now directed towards embodiments of the portable electronic device architecture. FIG. 4 is a block diagram of one embodiment of portable electronic device. A portable electronic device 400 generally includes one or more computer-readable mediums 402, a processing system 404, an Input/Output (I/O) subsystem 406, radio frequency (RF) circuitry 408 and audio circuitry 410. These components may be coupled by one or more communication buses or signal lines 403. The device 400 can be any portable electronic device, including but not limited to a handheld computer, a tablet computer, a mobile phone, a media player, personal digital assistant (PDA) and the like, including a combination of two or more of these items.

It should be apparent that the architecture shown in FIG. 4 is only one example of an architecture for the portable electronic device 400, and that the device 400 could have more or fewer components than shown, or a different configuration of components. The various components shown in FIG. 4 can be implemented in hardware, software, or a combination of both hardware and software, including one or more signal processing and/or application specific integrated circuits. The RF circuitry 408 is used to send and receive information over a wireless link or network to one or more other devices and includes well-known circuitry for performing this function, including but not limited to an antenna system, an RF transceiver, one or more amplifiers, a tuner, one or more oscillators, a digital signal processor, a CODEC chipset, memory, etc. In some embodiments, the RF circuitry 408 is capable of establishing and maintaining communications with other devices using one or more communications protocols, including but not limited to time division multiple access (TDMA), code division multiple access (CDMA), global system for mobile communications (GSM), Enhanced Data GSM Environment (EDGE), wideband code division multiple access (W-CDMA), Wi-Fi (such as IEEE 802.11a, IEEE 802.11b, IEEE 802.11g and/or IEEE 802.11n), Bluetooth, Wi-MAX, voice over Internet Protocol (VoIP), a protocol for email, instant messaging, and/or a short message service (SMS), or any other suitable communication protocol, including communication protocols not yet developed as of the filing date of this document.

The RF circuitry 408 and the audio circuitry 410 are coupled to the processing system 404 via the peripherals interface 416. The interface 416 includes various known components for establishing and maintaining communication between peripherals and the processing system 404. The audio circuitry 410 is coupled to an audio speaker 450 and a microphone 452 and includes known circuitry for processing voice signals received from interface 416 to enable a user to communicate in real-time with other users. In some embodiments, the audio circuitry 410 includes a headphone jack (not shown). Voice and data information received by the RF circuitry 408 and the audio circuitry 410 (e.g., in speech recognition or voice command applications) is sent to one or more processors 418 via the peripherals interface 416. The one or more processors 418 are configurable to process various data formats for one or more applications programs 430 stored on the medium 402.

Note that the term "data" includes but is not limited to text, graphics, Web pages, JAVA applets, widgets, emails, instant messages, voice, digital images or video, widgets, MP3s, etc., which can be used by one or more applications programs 430 stored on the medium 402 (e.g., Web browser, email, etc.). In some embodiments, the device 400 is capable of uploading and downloading various data from the Internet over a wireless network or an external port 436, such as files, songs, digital images, videos, emails, widgets, instant messages and the like.

The peripherals interface 416 couples the input and output peripherals of the device to the processor 418 and the computer-readable medium 402. The one or more processors 418 communicate with the one or more computer-readable mediums 402 via a controller 420. The computer-readable medium 402 can be any device or medium that can store code and/or data for use by the one or more processors 418. The medium 402 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). The medium 402 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

The one or more processors 418 run various software components stored in the medium 402 to perform various functions for the device 400. In some embodiments, the software components include an operating system 422, a communication module (or set of instructions) 424, a contact/motion module (or set of instructions) 426, a graphics module (or set of instructions) 428, one or more applications (or set of instructions) 430, a timer module (or set of instructions) 438 and a reconfiguration module (or set of instructions) 440.

The operating system 422 (e.g., Darwin, RTXC, LINUX, UNIX, OS X, WINDOWS, or an embedded operating system such as VxWorks) includes various procedures, sets of instructions, software components and/or drivers for controlling and managing general system tasks (e.g., memory management, storage device control, power management, etc.) and facilitates communication between various hardware and software components.

The communication module 424 facilitates communication with other devices over one or more external ports 436 or via RF circuitry 408 and includes various software components for handling data received from the RF circuitry 408 and/or the external port 436. The external port 436 (e.g., USB, FireWire™, etc.) is adapted for coupling directly to other devices or indirectly over a network (e.g., the Internet, wireless LAN, etc.).

The graphics module 428 includes various known software components for rendering, animating and displaying graphical objects on a display surface of a touch-sensitive display system 412. Note that the term "graphical object" includes any object that can be displayed to a user, including without limitation text, web pages, icons, digital images, animations and the like.

The one or more applications 430 can include any applications installed on the device 400, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), etc.

In some embodiments, the device 400 may include the functionality of an MP3 player, such as an iPod (trademark of Apple Computer, Inc.). The device 400 may, therefore, include a 36-pin connector that is compatible with the iPod. In some embodiments, the device 400 may include one or more optional optical sensors (not shown), such as CMOS or CCD image sensors, for use in imaging applications.

The contact/motion module 426 includes various software components for performing various tasks associated with the touch-sensitive display system 412, as previously described with respect to the embodiments in FIGS. 1-3.

The timer module 438 is a software timer used with the interface reconfiguration process 100 (FIG. 1). The timer module 438 can also be implemented in hardware.

The reconfiguration module 440 may include an icon effects module (or a set of instructions) 442. The icon effects module 442 may include animation for the icons during the interface reconfiguration mode. In some embodiments, the icon effects module 442 may be included in the graphics module 428.

The I/O subsystem 406 is coupled to the touch-sensitive display system 412 and one or more other physical control devices 414 (e.g., pushbuttons, switches, dials, LEDs, etc.) for controlling or performing various functions, such as power control, speaker volume control, ring tone loudness, keyboard input, scrolling, hold, menu, screen lock, clearing and ending communications and the like. The touch-sensitive display 412 communicates with the processing system 404 via the touch sensitive screen controller 432, which includes various components for processing user input (e.g., scanning hardware). The one or more other input controllers 434 receives/sends electrical signals from/to the other input or control devices 414. The other input/control devices 414 may include physical buttons (e.g., push buttons, rocker buttons, etc.), dials, slider switches, sticks, and so forth.

The touch-sensitive display 412 displays visual output to the user in a GUI. The visual output may include text, graphics, video, and any combination thereof. Some or all of the visual output may correspond to user-interface objects. The touch-sensitive display 412 may also accept input from the user based on haptic and/or tactile contact. The touch-sensitive display 412 forms a touch-sensitive surface that accepts user input. The touch-sensitive display 412 and the touch screen controller 432 (along with any associated modules and/or sets of instructions in the medium 402) detects contact (and any movement or release of the contact) on the touch-sensitive display 412 and converts the detected contact into interaction with user-interface objects, such as one or more soft keys, that are displayed on the touch screen when the contact occurs. In an exemplary embodiment, a point of contact between the touch-sensitive display 412 and the user corresponds to one or more digits of the user. The touch-sensitive display 412 may use LCD (liquid crystal display) technology, or LPD (light emitting polymer display) technology, although other display technologies may be used in other embodiments. The touch-sensitive display 412 and touch screen controller 432 may detect contact and any movement or release thereof using any of a plurality of touch sensitivity technologies, including but not limited to capacitive, resistive, infrared, and surface acoustic wave technologies, as well as other proximity sensor arrays or other elements for determining one or more points of contact with the touch-sensitive display 412.

The touch-sensitive display may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, the touch screen 126 displays visual output from the portable device, whereas touch sensitive tablets do not provide visual output. The touch-sensitive display 412 may have a resolution in excess of 100 dpi. In an exemplary embodiment, the touch-sensitive display 412 may have a resolution of approximately 168 dpi. The user may make contact with the touch-sensitive display 412 using any suitable object or appendage, such as a stylus, pen, finger, and so forth.

In some embodiments, in addition to the touch screen, the device 400 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch-sensitive display 412 or an extension of the touch-sensitive surface formed by the touch-sensitive display 412.

The device 400 also includes a power system 444 for powering the various hardware components. The power system 444 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in portable devices.

In some embodiments, the peripherals interface 416, the one or more processors 418, and the memory controller 420 may be implemented on a single chip, such as the processing system 404. In some other embodiments, they may be implemented on separate chips.

Repositioning Icons

Figure 5:
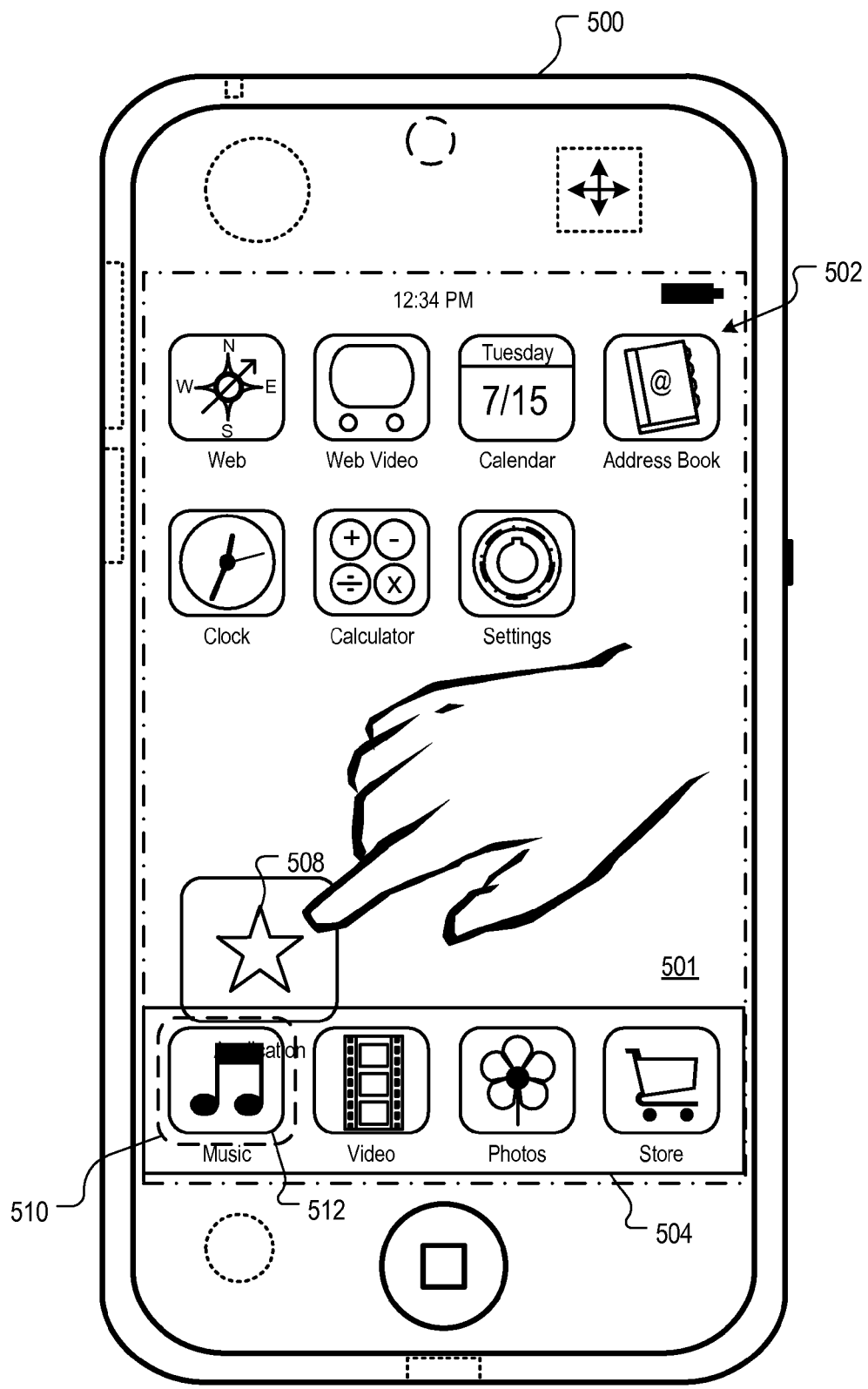
FIG. 5 is a block diagram of one embodiment of a portable electronic device illustrating repositioning of icons in one or more regions of a user interface.

FIG. 5 is a block diagram of one example of a portable electronic device illustrating the repositioning of user interface elements (hereinafter referred to generally as "icons") in one or more regions of a user interface. In some implementations, one or more icons 502 can be repositioned by a user in a user interface 501 of a device (e.g., portable electronic device 500). In some implementations, a user can initiate an interface reconfiguration mode on the device 500. While in the interface reconfiguration mode, one or more of the icons 502 can be repositioned in the user interface 501 by the user. While in the interface reconfiguration mode, the user can touch one of the icons 502 and drag it to a desired new position on the user interface 501. For example, the user can drag an icon 508 selected from the icons 502 to an empty or occupied position in a tray 504, in which case an occupying icon 512 will be replaced by the icon 508.

In some implementations, when the device 500 enters an interface reconfiguration mode, the icons 502 that are movable are displayed at a scaled size (e.g., scaled up by 150%). When the device 500 exits the interface reconfiguration mode, the icons 502 are displayed at their original size. Alternatively, an icon that the user touches and moves while the device 500 is in the interface reconfiguration mode (as opposed to all of the movable icons 502) is displayed at a scaled size to indicate its selection status to the user. When the touching ceases the icon can be displayed at its original size again. In other implementations, the selected icon can change color, animate, flash, change shape, display text or otherwise modify its visual appearance. In addition to changing its visual appearance, the device 500 can emit an audible sound (e.g., tone, succession of tones) to indicate its selection status. In some implementations, the repositioning of icons can be enabled without entering a reconfiguration mode on the device 500.

In some implementations where icons can be displayed in multiple "pages" and the user can navigate between the pages, as described in U.S. patent application Ser. No. 11/850,005, for "Application Menu User Interface," filed Sep. 4, 2007, which patent application is incorporated by reference herein in its entirety. In such implementations, the user can drag an icon from a first page of icons to a second page of icons. For example, a user can touch and drag an icon in the first page and drag the icon toward the edge of the user interface 501. When the icon is dragged to within a predetermined distance from the edge of the user interface 501 (e.g., 5 pixels), the first page of icons displayed on the user interface 501 can be replaced with a second page of icons. The user can then position the dragged icon within the second page, which is now displayed on the user interface 501.

In some implementations, a user can drag a first icon toward a second icon in the user interface 501 to exchange the positions of the two icons in the user interface 501. In this case, the second icon can be displayed with additional graphical effects to indicate its selection status for exchange with, or replacement by, the first icon. For example, the second icon can be displayed with an oscillating visual intensity, from a high intensity (e.g., bright) to a low intensity (e.g., dim) and back to high intensity. As another example, the second icon can be displayed with a "glow" effect. In some implementations, the additional graphical effects applied to the second icon can be triggered when the first icon is moved to within a predetermined distance of the second icon.

FIG. 5 illustrates an example mobile device 500 with a first icon 508 moved into proximity of a second icon 512 located in tray 504. The proximity can be x pixels (e.g., 1 pixel) from the periphery of the icon 512 as indicated by a boundary 510. When the first icon 508 is moved such that any part of the first icon 508 is within the region enclosed by the boundary 510, the second icon 512 can be displayed with additional graphical effects, such as a glow effect or an oscillating intensity, for example. In some implementations, the additional graphical effects are not displayed when the user releases the touch on the first icon 508 over the second icon 512, and thus having them exchange positions, or when the user moves the first icon 508 outside of the region enclosed by the boundary 510.

In some implementations, the first icon 508 can be repositioned into an empty position in the tray 504. In such implementations, the outline 510 can be displayed to indicate the empty position within the tray 504 where the first icon 508 will be positioned when the user releases the touch. Other visual feedback can be provided to indicate an empty or available position in the tray 504, such as changing the color or opacity of the position in the tray 504 or applying a graphic, pattern overlay or animated object at the position in the tray 504.

Process for Exchanging Icon Positions

Figure 6:
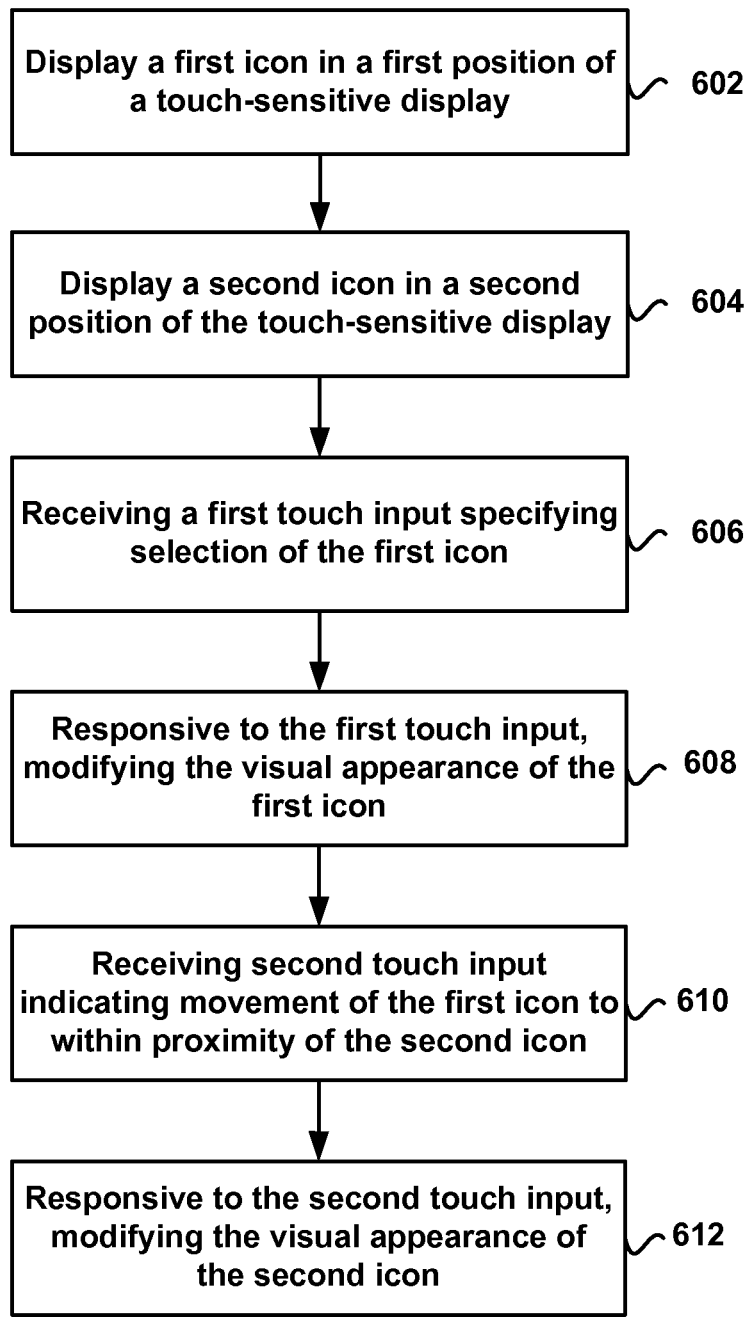
FIG. 6 is a flow diagram of one embodiment of a process for exchanging icons of a user interface.

FIG. 6 is a flow diagram of an example process 600 for exchanging icons of a user interface. In some implementations, the process 600 includes displaying a first icon in a first position of a touch-sensitive display (602). The touch-sensitive display can be a multi-touch sensitive display which is responsive to finger gestures as well as touch. A second icon is displayed in, or associated with, a second position of the touch-sensitive display (604). In some implementations, the first and second icon positions can be in different regions of a user interface. For example, the first region can be used to display a first set of icons and the second region can be a tray, dock, menu bar, a second page or any other user interface element capable of displaying a second set of icons in a manner that visually distinguishes or otherwise prominently displays the second set of icons from the first set of icons. The second set of icons can include icons that are frequently used icons or icons that have a common property or attribute (e.g. application icons).

The process 600 receives a first touch input specifying selection of the first icon (606). The touch can be with a finger or styles. Responsive to the first touch input, the visual appearance of the first icon is modified (608). Some examples of modifying the visual appearance of the first icon include but are not limited to: scaling, changing color, vibrating, bouncing, displaying text, animating, etc.

The process 600 receives a second touch input indicating movement of the first icon to within proximity of the second icon (610). The movement can be the dragging of the first icon across the display. In some implementations, proximity to the second icon occurs when a (transparent or non-transparent) boundary line at least partially surrounding the second icon is touched or crossed by the first icon as a result of, or in response to, the movement.

Responsive to the second touch input, the visual appearance of the second icon can be modified (612). Some examples of modifying the second icon include but are not limited to: scaling, applying a glowing effect, changing color, vibrating, bouncing, animating, etc.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
at a portable electronic device with a touch-sensitive display:
concurrently displaying a first region and a second region in an application menu user interface on the touch-sensitive display, the first region configured to display multiple pages of application icons, the first region displaying a first page of application icons in the multiple pages of application icons, the first page of application icons including a first application icon at a first location, the second region comprising a tray, dock, or menu bar with a set of icons between the first region and the bottom of the touch-sensitive display;
while concurrently displaying the first region and the second region in the application menu user interface on the touch-sensitive display:
receiving a touch input by a single finger contact on the first application icon in the first page of application icons, the touch input specifying selection of the first application icon;
responsive to the touch input by the single finger contact on the first application icon in the first page of application icons specifying selection of the first application icon, modifying the visual appearance of the first application icon;
receiving a dragging touch input by the single finger contact without breaking contact with the touch-sensitive display, the dragging touch input removing the first application icon from the first location and moving the first application icon to within proximity of an edge of the touch-sensitive display;
responsive to the dragging touch input moving the first application icon to within proximity of the edge of the touch-sensitive display, replacing display of the first page of application icons with display of a second page of application icons in the multiple pages of application icons in the first region of the application menu user interface and maintaining display of the second region between the first region and the bottom of the touch-sensitive display;
receiving a dragging touch input by the single finger contact without breaking contact with the touch-sensitive display that moves the first application icon within the second page of application icons; and
responsive to the dragging touch input by the single finger contact that moves the first application icon within the second page of application icons, positioning the first application icon within the second page of application icons.

2. The method of claim 1, further comprising:
receiving a dragging touch input by the single finger contact without breaking contact with the touch-sensitive display indicating movement of the first application icon to within proximity of an application icon in the set of icons in the tray, dock, or menu bar; and
responsive to the dragging touch input by the single finger contact indicating movement of the first application icon to within proximity of the application icon in the set of icons in the tray, dock, or menu bar, modifying the visual appearance of the application icon in the set of icons in the tray, dock, or menu bar.

3. The method of claim 1, where modifying the first application icon includes scaling the first application icon to a different size.

4. The method of claim 2, where modifying the application icon in the set of icons in the tray, dock, or menu bar includes applying a glowing effect to the application icon in the set of icons in the tray, dock, or menu bar.

5. The method of claim 2, where receiving the dragging touch input indicating movement of the first application icon to within proximity of the application icon in the set of icons in the tray, dock, or menu bar further comprises:
receiving input by the single finger contact indicating that a boundary line at least partially surrounding the application icon in the set of icons in the tray, dock, or menu bar is touched or crossed by the first application icon in response to the movement.

6. The method of claim 2, further comprising:
exchanging the positions of the first application icon and the application icon in the set of icons in the tray, dock, or menu bar.

7. A portable electronic device comprising:
a touch-sensitive display;
memory; and
one or more programs, wherein the one or more programs are stored in the memory and configured to be executed by the one or more processors, the one or more programs including instructions for:
concurrently displaying a first region and a second region in an application menu user interface on the touch-sensitive display, the first region configured to display multiple pages of application icons, the first region displaying a first page of application icons in the multiple pages of application icons, the first page of application icons including a first application icon at a first location, the second region comprising a tray, dock, or menu bar with a set of icons between the first region and the bottom of the touch-sensitive display;
while concurrently displaying the first region and the second region in the application menu user interface on the touch-sensitive display:
receiving a touch input by a single finger contact on the first application icon in the first page of application icons, the touch input specifying selection of the first application icon;
responsive to the touch input by the single finger contact on the first application icon in the first page of application icons specifying selection of the first application icon, modifying the visual appearance of the first application icon;
receiving a dragging touch input by the single finger contact without breaking contact with the touch-sensitive display, the dragging touch input removing the first application icon from the first location and moving the first application icon to within proximity of an edge of the touch-sensitive display;
responsive to the dragging touch input moving the first application icon to within proximity of the edge of the touch-sensitive display, replacing display of the first page of application icons with display of a second page of application icons in the multiple pages of application icons in the first region of the application menu user interface and maintaining display of the second region between the first region and the bottom of the touch-sensitive display;
receiving a dragging touch input by the single finger contact without breaking contact with the touch-sensitive display that moves the first application icon within the second page of application icons; and
responsive to the dragging touch input by the single finger contact that moves the first application icon within the second page of application icons, positioning the first application icon within the second page of application icons.

8. The device of claim 7, including instructions for:
receiving a dragging touch input by the single finger contact without breaking contact with the touch-sensitive display indicating movement of the first application icon to within proximity of an application icon in the set of icons in the tray, dock, or menu bar;
responsive to the dragging touch input by the single finger contact indicating movement of the first application icon to within proximity of the application icon in the set of icons in the tray, dock, or menu bar, modifying the visual appearance of the application icon in the set of icons in the tray, dock, or menu bar.

9. The device of claim 7, where modifying the first application icon includes scaling the first application icon to a different size.

10. The device of claim 8, where modifying the application icon in the set of icons in the tray, dock, or menu bar includes applying a glowing effect to the application icon in the set of icons in the tray, dock, or menu bar.

11. The device of claim 8, where receiving the dragging touch input indicating movement of the application icon to within proximity of the application icon in the set of icons in the tray, dock, or menu bar further comprises:
receiving input by the single finger contact indicating that a boundary line at least partially surrounding the application icon in the set of icons in the tray, dock, or menu bar is touched or crossed by the first application icon in response to the movement.

12. The device of claim 8, including instructions for exchanging the positions of the first application icon and the application icon in the set of icons in the tray, dock, or menu bar.

13. A non-transitory computer-readable storage medium having instructions stored thereon, which, when executed by a portable electronic device with a touch-sensitive display, cause the device to perform operations comprising:
concurrently displaying a first region and a second region in an application menu user interface on the touch-sensitive display, the first region configured to display multiple pages of application icons, the first region displaying a first page of application icons in the multiple pages of application icons, the first page of application icons including a first application icon at a first location, the second region comprising a tray, dock, or menu bar with a set of icons between the first region and the bottom of the touch-sensitive display;
while concurrently displaying the first region and the second region in the application menu user interface on the touch-sensitive display:
receiving a touch input by a single finger contact on the first application icon in the first page of application icons, the touch input specifying selection of the first application icon;
responsive to the touch input by the single finger contact on the first application icon in the first page of application icons specifying selection of the first application icon, modifying the visual appearance of the first application icon;
receiving a dragging touch input by the single finger contact without breaking contact with the touch-sensitive display, the dragging touch input removing the first application icon from the first location and moving the first application icon to within proximity of an edge of the touch-sensitive display;

responsive to the dragging touch input moving the first application icon to within proximity of the edge of the touch-sensitive display, replacing display of the first page of application icons with display of a second page of application icons in the multiple pages of application icons in the first region of the application menu user interface and maintaining display of the second region between the first region and the bottom of the touch-sensitive display;

receiving a dragging touch input by the single finger contact without breaking contact with the touch-sensitive display that moves the first application icon within the second page of application icons; and responsive to the dragging touch input by the single finger contact that moves the first application icon within the second page of application icons, positioning the first application icon within the second page of application icons.

14. The non-transitory computer-readable storage medium of claim 13, where modifying the first application icon includes scaling the first application icon to a different size.

15. The non-transitory computer-readable storage medium of claim 13, further having instructions which cause the device to perform operations comprising:

receiving a dragging touch input by the single finger contact without breaking contact with the touch-sensitive display indicating movement of the first application icon to within proximity of an application icon in the set of icons in the tray, dock, or menu bar; and responsive to the dragging touch input by a single finger contact indicating movement of the first application icon to within proximity of the application icon in the set of icons in the tray, dock, or menu bar, modifying the visual appearance of the application icon in the set of icons in the tray, dock, or menu bar.

16. The non-transitory computer-readable storage medium of claim 15, where modifying the application icon in the set of icons in the tray, dock, or menu bar includes applying a glowing effect to the application icon in the set of icons in the tray, dock, or menu bar.

17. The non-transitory computer-readable storage medium of claim 15, where receiving the dragging touch input indicating movement of the first application icon to within proximity of the application icon in the set of icons in the tray, dock, or menu bar further comprises:

receiving input by a single finger contact indicating that a boundary line at least partially surrounding the application icon in the set of icons in the tray, dock, or menu bar is touched or crossed by the first application icon in response to the movement.

18. The non-transitory computer-readable storage medium of claim 15, further having instructions which-cause the device to perform operations comprising:

exchanging the positions of the first application icon and the application icon in the set of icons in the tray, dock, or menu bar.

* * * * *